United States Patent
Ito

(10) Patent No.: US 11,899,189 B2
(45) Date of Patent: Feb. 13, 2024

(54) VARIABLE MAGNIFICATION OPTICAL SYSTEM, OPTICAL DEVICE, AND METHOD FOR MANUFACTURING VARIABLE MAGNIFICATION OPTICAL SYSTEM

(71) Applicant: Nikon Corporation, Tokyo (JP)

(72) Inventor: Tomoki Ito, Kawasaki (JP)

(73) Assignee: Nikon Corporation, Tokyo (JP)

( * ) Notice: Subject to any disclaimer, the term of this patent is extended or adjusted under 35 U.S.C. 154(b) by 214 days.

(21) Appl. No.: 17/359,927

(22) Filed: Jun. 28, 2021

(65) Prior Publication Data

US 2021/0349294 A1 Nov. 11, 2021

Related U.S. Application Data

(63) Continuation of application No. 16/338,736, filed as application No. PCT/JP2017/037354 on Oct. 16, 2017, now Pat. No. 11,079,575.

(30) Foreign Application Priority Data

Oct. 18, 2016 (JP) .................................. 2016-204448

(51) Int. Cl.
  *G02B 15/14* (2006.01)
  *H04N 5/225* (2006.01)
  (Continued)

(52) U.S. Cl.
  CPC .... *G02B 15/145113* (2019.08); *G02B 13/009* (2013.01); *G02B 15/20* (2013.01)

(58) Field of Classification Search
  CPC .......... G02B 15/145113; G02B 13/009; G02B 15/20
  (Continued)

(56) References Cited

U.S. PATENT DOCUMENTS 5,299,064 A  3/1994 Hamano et al.
5,751,496 A  5/1998 Hamano
(Continued)

FOREIGN PATENT DOCUMENTS

CN  101071196 A  11/2007
EP  1 632 802 A2  3/2006
(Continued)

OTHER PUBLICATIONS

International Search Report from International Patent Application No. PCT/JP2017/037354, dated Nov. 14, 2017.
(Continued)

*Primary Examiner* — Joseph P Martinez
*Assistant Examiner* — Grant A Gagnon
(74) *Attorney, Agent, or Firm* — Potomac Law Group, PLLC

(57) ABSTRACT

Comprising, in order from an object side: a first lens group having positive refractive power, a second lens group having negative refractive power, a third lens group having positive refractive power, a fourth lens group having positive refractive power, and a fifth lens group having negative refractive power; upon varying a magnification, the first lens group being fixed with respect to the image plane, and each distance between the neighboring lens groups being varied; upon focusing, at least a portion of the fourth lens group being moved; and predetermined conditional expression(s) being satisfied, thereby variations in various aberrations upon varying magnification being superbly suppressed.

23 Claims, 14 Drawing Sheets

(51) Int. Cl.
*G02B 13/00* (2006.01)
*G02B 15/20* (2006.01)

(58) Field of Classification Search
USPC ............................................. 359/684
See application file for complete search history.

(56) References Cited

U.S. PATENT DOCUMENTS

| | | |
|---|---|---|
| 5,818,646 A | 10/1998 | Hamano |
| 2007/0285520 A1 | 12/2007 | Kuroda |
| 2008/0218878 A1 | 9/2008 | Arai et al. |
| 2011/0085247 A1 | 4/2011 | Matsumura et al. |
| 2012/0320251 A1 | 12/2012 | Saito |

FOREIGN PATENT DOCUMENTS

| | | | |
|---|---|---|---|
| JP | H05-224125 A | 9/1993 | |
| JP | H05-273466 A | 10/1993 | |
| JP | H08-327903 A | 12/1996 | |
| JP | H08-327904 A | 12/1996 | |
| JP | H09-269452 A | 10/1997 | |
| JP | 2000-121938 A | 4/2000 | |
| JP | 2006-071993 A | 3/2006 | |
| JP | 2007-148056 A | 6/2007 | |
| JP | 2007-328306 A | 12/2007 | |
| JP | 2008-216667 A | 9/2008 | |
| JP | 2008-268833 A | 11/2008 | |
| JP | 2011-085653 A | 4/2011 | |
| JP | 2011-085654 A | 4/2011 | |
| JP | 2011-141328 A | 7/2011 | |
| JP | 2013-003240 A | 1/2013 | |

OTHER PUBLICATIONS

Office Action dated Apr. 16, 2021, in Chinese Patent Application No. 201780064546.5.
Office Action dated Sep. 27, 2020, in Chinese Patent Application No. 201780064546.5.
Office Action dated Mar. 10, 2020, in Japanese Patent Application No. 2018-546323.

VARIABLE MAGNIFICATION OPTICAL SYSTEM, OPTICAL DEVICE, AND METHOD FOR MANUFACTURING VARIABLE MAGNIFICATION OPTICAL SYSTEM

TECHNICAL FIELD

The present invention relates to a variable magnification optical system, an optical device, and a method for manufacturing the variable magnification optical system.

BACKGROUND ART

There have been proposed a variable magnification optical system suitable for a photographing camera, a digital still camera, a video camera or the like. For example, see Japanese Patent application Laid-Open No. 2013-3240. However, the conventional variable magnification optical system has a problem that variations in aberrations are large.

PRIOR ART DOCUMENT

Patent Document

Patent Document 1: Japanese Patent application Laid-Open Gazette No. 2013-3240

SUMMARY OF THE INVENTION

According to a first aspect of the present invention, there is provided a variable magnification optical system comprising, in order from an object side: a first lens group having positive refractive power; a second lens group having negative refractive power; a third lens group having positive refractive power; a fourth lens group having positive refractive power; and a fifth lens group having negative refractive power;

upon varying a magnification, the first lens group being fixed with respect to the image plane; and each distance between the neighboring lens groups being varied;

upon focusing, at least a portion of the fourth lens group being moved; and the following conditional expressions being satisfied:

$$1.20 < f5/f2 < 3.60$$

$$0.80 < f3/f4 < 2.20$$

where f5 denotes a focal length of the fifth lens group, f2 denotes a focal length of the second lens group, f3 denotes a focal length of the third lens group, and f4 denotes a focal length of the fourth lens group.

Further, according to a second aspect of the present invention, there is provided a method for manufacturing a variable magnification optical system comprising, in order from an object side: a first lens group having positive refractive power; a second lens group having negative refractive power; a third lens group having positive refractive power; a fourth lens group having positive refractive power; and a fifth lens group having negative refractive power; the method comprising the steps of:

arranging such that the following conditional expressions are satisfied:

$$1.20 < f5/f2 < 3.60$$

$$0.80 < f3/f4 < 2.20$$

where f5 denotes a focal length of the fifth lens group, f2 denotes a focal length of the second lens group, f3 denotes a focal length of the third lens group, and f4 denotes a focal length of the fourth lens group;

arranging such that, upon varying a magnification, the first lens group is fixed with respect to the image plane, and each distance between the neighboring lens groups are varied; and arranging such that, upon focusing, at least a portion of the fourth lens group is moved.

EMBODIMENTS FOR CARRYING OUT THE INVENTION

Figure 1:
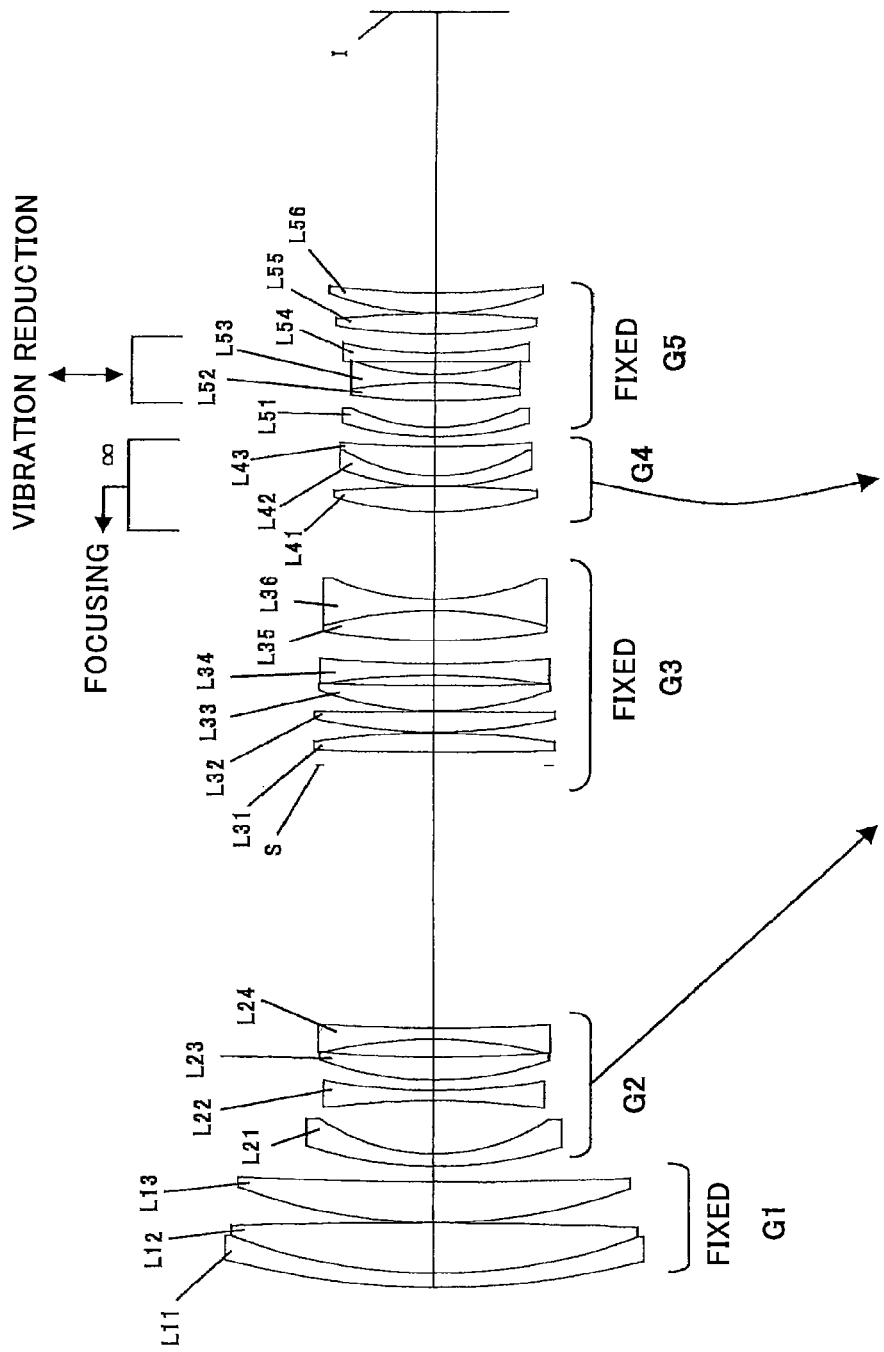
FIG. 1 is a sectional view showing a variable magnification optical system according to a First Example, in a wide-angle end state.

A variable magnification optical system, an optical device and a method for manufacturing the variable magnification optical system according to an embodiment of the present application are explained below.

The variable magnification optical system according to the present embodiment comprises, in order from an object side: a first lens group having positive refractive power, a second lens group having negative refractive power, a third lens group having positive refractive power, a fourth lens group having positive refractive power, and a fifth lens group having negative refractive power; and upon varying magnification, the first lens group being fixed with respect to the image plane, and each distance between the neighboring lens groups being varied. With this configuration, the variable magnification optical system according to the present embodiment can realize varying magnification and suppress various variations, in particular, variation in spherical aberration and variation in curvature of field. Further, since the first lens group is fixed upon varying magnification, a mechanism for driving lens groups can be simplified and a lens barrel can be small-sized.

Further, according to the variable magnification optical system according to the present embodiment having such a configuration, at least a portion of the fourth lens group is moved upon focusing. With this configuration, an amount of movement of the focusing lens group upon focusing can be suppressed, and a whole length of the entire optical system can be suppressed, thereby the entire optical system being able to be made compact in size.

The variable magnification optical system according to the present embodiment having such a configuration satisfies the following conditional expression (1):

$$1.20 < f5/f2 < 3.60 \qquad (1)$$

where f5 denotes a focal length of the fifth lens group, and f2 denotes a focal length of the second lens group.

The conditional expression (1) relates to a ratio of the focal length of the fifth lens group to the focal length of the second lens group and is a conditional expression for defining an adequate value. By satisfying the conditional expression (1), it is possible to correct superbly coma aberration, spherical aberration and astigmatism.

When the value of f5/f2 in the conditional expression (1) is equal to or exceeds the upper limit value of the conditional expression (1), refractive power of the second lens group becomes large, and it becomes difficult to correct coma aberration in the wide angle end state and spherical aberration in the telephoto end state. Therefore, it is not desirable. Meanwhile, in order to attain the advantageous effect of the present embodiment surely, it is preferable to set the upper limit value of the conditional expression (1) to 3.30. In order to attain the advantageous effect of the present application more surely, it is preferable to set the upper limit value of the conditional expression (1) to 3.00. In order to attain the advantageous effect of the present application further more surely, it is preferable to set the upper limit value of the conditional expression (1) to 2.80.

When the value of f5/f2 in the conditional expression (1) is equal to or falls below the lower limit value of the conditional expression (1), refractive power of the fifth lens group becomes large and it becomes difficult to correct astigmatism. It is not desirable. Meanwhile, in order to attain the advantageous effect of the present embodiment surely, it is preferable to set the lower limit value of the conditional expression (1) to 1.35. In order to attain the advantageous effect of the present embodiment more surely, it is more preferable to set the lower limit value of the conditional expression (1) to 1.50. In order to attain the advantageous effect of the present embodiment further more surely, it is preferable to set the lower limit value of the conditional expression (1) to 1.60.

The variable magnification optical system according to the present embodiment having such a configuration satisfies the following conditional expression (2):

$$0.80 < f3/f4 < 2.20 \qquad (2)$$

where f3 denotes a focal length of the third lens group, and f4 denotes a focal length of the fourth lens group.

The conditional expression (2) relates to a ratio of the focal length of the third lens group to the focal length of the fourth lens group and is a conditional expression for defining an adequate value. By satisfying the conditional expression (2), it is possible to correct superbly spherical aberration and curvature of field upon focusing.

When the value of f3/f4 in the conditional expression (2) is equal to or exceeds the upper limit value of the conditional expression (2), refractive power of the fourth lens group becomes large, and it becomes difficult to correct spherical aberration and curvature of field upon focusing. Therefore, it is not desirable. Meanwhile, in order to attain the advantageous effect of the present embodiment surely, it is preferable to set the upper limit value of the conditional expression (2) to 2.00. In order to attain the advantageous effect of the present application more surely, it is preferable to set the upper limit value of the conditional expression (2) to 1.80.

When the value of f3/f4 in the conditional expression (2) is equal to or falls below the lower limit value of the conditional expression (2), refractive power of the third lens group becomes large and it becomes difficult to correct spherical aberration in the telephoto end state. It is not desirable. Meanwhile, in order to attain the advantageous effect of the present embodiment surely, it is preferable to set the lower limit value of the conditional expression (2) to 1.00.

In order to attain the advantageous effect of the present embodiment more surely, it is more preferable to set the lower limit value of the conditional expression (2) to 1.20.

It is preferable that in the variable magnification optical system according to the present embodiment, the third lens group is fixed relative to the image plane upon varying magnification. With such a configuration, a mechanism for driving lens groups can be simplified, so a lens barrel can be small-sized.

It is preferable that in the variable magnification optical system according to the present embodiment, the fifth lens group is fixed relative to the image plane upon varying magnification. With such a configuration, a mechanism for driving lens groups can be simplified, so a lens barrel can be small-sized.

It is preferable that in the variable magnification optical system according to the present embodiment, an aperture stop is disposed between the second lens group and the fourth lens group. With such a configuration, it is possible to correct superbly coma aberration and curvature of field.

It is preferable that in the variable magnification optical system according to the present embodiment, at least a portion of the fifth lens group is moved to have a component in a direction perpendicular to the optical axis. With such a configuration, it is possible to correct superbly eccentric coma aberration and curvature of field caused upon correcting a camera shake. Further, a movement mechanism for vibration reduction lens group can be small-sized.

It is preferable that the variable magnification optical system according to the present embodiment satisfies the following conditional expression (3):

$$0.64 < f4/(-f2) < 2.20 \quad (3)$$

where f4 denotes a focal length of the fourth lens group, and f2 denotes a focal length of the second lens group.

The conditional expression (3) relates to a ratio of the focal length of the fourth lens group to the focal length of the second lens group and is a conditional expression for defining a proper value. By satisfying the conditional expression (3), it is possible to correct superbly coma aberration, spherical aberration and curvature of field.

When the value of f4/(−f2) is equal to or exceeds the upper limit value of the conditional expression (3), refractive power of the second lens group becomes large, and it becomes difficult to correct coma aberration in the wide angle end state and spherical aberration in the telephoto end state. Therefore, it is not desirable. Meanwhile, in order to attain the advantageous effect of the present embodiment surely, it is preferable to set the upper limit value of the conditional expression (3) to 1.90. In order to attain the advantageous effect of the present embodiment more surely, it is preferable to set the upper limit value of the conditional expression (3) to 1.50. In order to attain the advantageous effect of the present embodiment further more surely, it is preferable to set the upper limit value of the conditional expression (3) to 1.40.

When the value of f4/(−f2) is equal to or falls below the lower limit value of the conditional expression (3), refractive power of the fourth lens group becomes large, and it becomes difficult to correct spherical aberration and curvature of field upon focusing. Therefore, it is not desirable. Meanwhile, in order to attain the advantageous effect of the present embodiment surely, it is preferable to set the lower limit value of the conditional expression (3) to 0.80. In order to attain the advantageous effect of the present application more surely, it is preferable to set the lower limit value of the conditional expression (3) to 1.00. In order to attain the advantageous effect of the present embodiment further more surely, it is preferable to set the lower limit value of the conditional expression (3) to 1.05.

It is preferable that the variable magnification optical system according to the present embodiment satisfies the following conditional expression (4):

$$0.94 < (-f5)/f4 < 3.00 \quad (4)$$

where f5 denotes a focal length of the fifth lens group, and f4 denotes a focal length of the fourth lens group.

The conditional expression (4) relates to a ratio of the focal length of the fifth lens group to the focal length of the fourth lens group and is a conditional expression for defining a proper value. By satisfying the conditional expression (4), it is possible to correct superbly spherical aberration and curvature of field upon focusing.

When the value of (−f5)/f4 is equal to or exceeds the upper limit value of the conditional expression (4), refractive power of the fourth lens group becomes large, and it becomes difficult to correct spherical aberration and curvature of field upon focusing. Therefore, it is not preferable. Meanwhile, in order to attain the advantageous effect of the present embodiment surely, it is preferable to set the upper limit value of the conditional expression (4) to 2.70. In order to attain the advantageous effect of the present embodiment more surely, it is preferable to set the upper limit value of the conditional expression (4) to 2.50. In order to attain the advantageous effect of the present embodiment further more surely, it is preferable to set the upper limit value of the conditional expression (4) to 2.30.

When the value of (−f5)/f4 is equal to or falls below the lower limit value of the conditional expression (4), refractive power of the fifth lens group becomes large, and it becomes difficult to correct astigmatism. Therefore, it is not preferable. Meanwhile, in order to attain the advantageous effect of the present embodiment surely, it is preferable to set the lower limit value of the conditional expression (4) to 1.20. In order to attain the advantageous effect of the present embodiment more surely, it is preferable to set the lower limit value of the conditional expression (4) to 1.30.

It is preferable that the variable magnification optical system according to the present embodiment satisfies the following conditional expression (5):

$$1.00 < f1/(-f2) < 4.50 \quad (5)$$

where f1 denotes a focal length of the first lens group, and f2 denotes a focal length of the second lens group.

The conditional expression (5) relates to a ratio of the focal length of the first lens group to the focal length of the second lens group and is a conditional expression for defining an adequate value. By satisfying the conditional expression (5), it is possible to correct superbly spherical aberration and coma aberration.

When the value of f1/(−f2) in the conditional expression (5) is equal to or exceeds the upper limit value of the conditional expression (5), refractive power of the second lens group becomes large, and it becomes difficult to correct coma aberration in the wide angle end state and spherical aberration in the telephoto end state. Therefore, it is not preferable. Meanwhile, in order to attain the advantageous effect of the present embodiment surely, it is preferable to set the upper limit value of the conditional expression (5) to 4.00. In order to attain the advantageous effect of the present application more surely, it is preferable to set the upper limit value of the conditional expression (5) to 3.50.

When the value of f1/(−f2) in the conditional expression (5) is equal to or falls below the lower limit value of the conditional expression (5), refractive power of the first lens group becomes large, and it becomes difficult to correct spherical aberration in the telephoto end state. Therefore, it is not preferable. Meanwhile, in order to attain the advantageous effect of the present embodiment surely, it is preferable to set the lower limit value of the conditional expression (5) to 2.00. In order to attain the advantageous effect of the present embodiment more surely, it is preferable to set the lower limit value of the conditional expression (5) to 2.60.

It is preferable that the variable magnification optical system according to the present embodiment satisfies the following conditional expression (6):

$$1.00 < f3/(-f2) < 4.20 \quad (6)$$

where f3 denotes a focal length of the third lens group, and f2 denotes a focal length of the second lens group.

The conditional expression (6) relates to a ratio of the focal length of the third lens group to the focal length of the second lens group and is a conditional expression for defining an adequate value. By satisfying the conditional expression (6), it is possible to correct superbly spherical aberration and coma aberration.

When the value of f3/(−f2) in the conditional expression (6) is equal to or exceeds the upper limit value of the conditional expression (6), refractive power of the second lens group becomes large, and it becomes difficult to correct coma aberration in the wide angle end state and spherical aberration in the telephoto end state. Therefore, it is not preferable. Meanwhile, in order to attain the advantageous effect of the present embodiment surely, it is preferable to set the upper limit value of the conditional expression (6) to 4.00. In order to attain the advantageous effect of the present application more surely, it is preferable to set the upper limit value of the conditional expression (6) to 3.00.

When the value of f3/(−f2) in the conditional expression (6) is equal to or falls below the lower limit value of the conditional expression (6), refractive power of the third lens group becomes large, and it becomes difficult to correct spherical aberration in the telephoto end state. Therefore, it is not preferable. Meanwhile, in order to attain the advantageous effect of the present embodiment surely, it is preferable to set the lower limit value of the conditional expression (6) to 1.10. In order to attain the advantageous effect of the present embodiment more surely, it is preferable to set the lower limit value of the conditional expression (6) to 1.20.

It is preferable that the variable magnification optical system according to the present embodiment satisfies the following conditional expression (7):

$$0.60 < f1/(-f5) < 2.70 \quad (7)$$

where f1 denotes a focal length of the third lens group, and f5 denotes a focal length of the second lens group.

The conditional expression (7) relates to a ratio of the focal length of the first lens group to the focal length of the fifth lens group and is a conditional expression for defining an adequate value. By satisfying the conditional expression (7), it is possible to correct superbly astigmatism and spherical aberration.

When the value of f1/(−f5) in the conditional expression (7) is equal to or exceeds the upper limit value of the conditional expression (7), refractive power of the fifth lens group becomes large, and it becomes difficult to correct astigmatism. Therefore, it is not preferable. Meanwhile, in order to attain the advantageous effect of the present embodiment surely, it is preferable to set the upper limit value of the conditional expression (7) to 2.50. In order to attain the advantageous effect of the present application more surely, it is preferable to set the upper limit value of the conditional expression (7) to 2.00.

When the value of f1/(−f5) in the conditional expression (7) is equal to or falls below the lower limit value of the conditional expression (7), refractive power of the first lens group becomes large, and it becomes difficult to correct spherical aberration in the telephoto end state. Therefore, it is not preferable. Meanwhile, in order to attain the advantageous effect of the present embodiment surely, it is preferable to set the lower limit value of the conditional expression (7) to 0.80. In order to attain the advantageous effect of the present embodiment more surely, it is preferable to set the lower limit value of the conditional expression (7) to 1.00.

An optical apparatus according to the present embodiment is equipped with a variable magnification optical system having a constitution described above. With this configuration, it is possible to realize an optical apparatus which can suppress excellently variations in aberrations upon varying magnification.

In a method for manufacturing a variable magnification optical system according to the present embodiment, the variable magnification optical system comprises, in order from an object side: a first lens group having positive refractive power; a second lens group having negative refractive power; a third lens group having positive refractive power; a fourth lens group having positive refractive power; and a fifth lens group having negative refractive power. The method comprises the steps of: constituting to satisfy the following conditional expressions (1) and (2):

$$1.20 < f5/f2 < 3.60 \quad (1)$$

$$0.80 < f3/f4 < 2.20 \quad (2)$$

where f5 denotes a focal length of the fifth lens group, f2 denotes a focal length of the second lens group, f3 denotes a focal length of the third lens group, and f4 denotes a focal length of the fourth lens group;

constituting such that, upon varying magnification, the first lens group is fixed with respect to the image plane and each distance between the neighboring lens groups is varied; and constituting such that, upon focusing, at least a portion of the fourth lens group is moved along the optical axis.

By the method for manufacturing the variable magnification optical system described above, it is possible to manufacture a variable magnification optical system which can suppress variations in aberrations upon varying magnification.

Numerical Examples

Hereinafter, variable magnification optical systems relating to numerical examples according to the present embodiment will be explained with reference to the accompanying drawings.

First Example

FIG. 1 is a sectional view showing a variable magnification optical system according to the First Example of the present embodiment in a wide-angle end state. Arrows in FIG. 1, and FIGS. 5 and 9 described later show moving trajectories of respective lens groups upon varying magnification from the wide angle end state to the telephoto end state.

The variable magnification optical system according to the present Example is composed of, in order from an object side along the optical axis: a first lens group G1 having positive refractive power, a second lens group G2 having negative refractive power, a third lens group G3 having positive refractive power, a fourth lens group G4 having positive refractive power, and a fifth lens group G5 having negative refractive power.

The first lens group G1 consists of, in order from the object side along the optical axis, a cemented positive lens constructed by a negative meniscus lens L11 having a convex surface facing the object side cemented with a double convex positive lens L12, and a positive meniscus lens L13 having a convex surface facing the object side.

The second lens group G2 consists of, in order from the object side along the optical axis, a negative meniscus lens L21 having a convex surface facing the object side, a double concave negative lens L22, a positive meniscus lens L23 having a convex surface facing the object side and a double concave negative lens L24.

The third lens group G3 consists of, in order from the object side along the optical axis, an aperture stop S, a double convex positive lens L31, a plano-convex lens L32 having a convex surface facing the object side, a positive meniscus lens L33 having a convex surface facing the object side, a double concave negative lens L34 and a cemented negative lens constructed by a double convex positive lens L35 cemented with a double concave negative lens L36.

The fourth lens group G4 consists of a double convex positive lens L41 and a cemented positive lens constructed by a negative meniscus lens L42 having a convex surface facing the object side cemented with a positive meniscus lens L43 having a convex surface facing the object side.

The fifth lens group G5 consists of a negative meniscus lens L51 having a convex surface facing the object side, a cemented negative lens constructed by a double convex positive lens L52 cemented with a double concave negative lens L53, a plano concave lens L54 having a concave surface facing the image side, a double convex positive lens L55 and a positive meniscus lens L56 having a convex surface facing the object side.

An imaging device (not shown) composed of CCD, CMOS or the like, is disposed on the image plane I.

With the above-mentioned configuration, in the variable magnification optical system according to the present Example, upon varying magnification from the wide-angle end state to the telephoto end state, the second lens group G2 and the fourth lens group G4 are moved along the optical axis such that a distance between the first lens group G1 and the second lens group G2, a distance between the second lens group G2 and the third lens group G3, a distance between the third lens group G3 and the fourth lens group G4, and a distance between the fourth lens group G4 and the fifth lens group G5 are varied, respectively. To be specific, the second lens group G2 is moved toward the image side and the fourth lens group G4 is moved once toward the object side and then toward the image side. Meanwhile, upon varying magnification, the first lens group G1, the third lens group G3 and the fifth lens group G5 are fixed in positions with respect to the image plane I.

In the variable magnification optical system according to the present Example, focusing from the infinitely distant object to the finite distance object is carried out by moving the fourth lens group G4 as a focusing lens group toward the object side along the optical axis.

In the variable magnification optical system according to the present Example, correction of the image plane upon image blur being caused, that is, vibration reduction is carried out by moving the cemented negative lens constructed by the double convex positive lens L52 and the double concave negative lens L53 and the plano concave lens L54 having the concave surface facing to the image side in the fifth lens group G5 as a vibration reduction lens group to have a component in a direction perpendicular to the optical axis along the optical axis.

Table 1 below shows various values of the variable magnification optical system according to the present Example.

In Table 1, f denotes a focal length, and BF denotes a back focal length, that is, a distance on the optical axis between the most image side lens surface and the image plane I, and f3 denotes an imaging magnification between the object and the image.

In [Surface Data], m denotes an order of an optical surface counted from the object side, r denotes a radius of curvature, d denotes a surface-to-surface distance (an interval from an n-th surface to an (n+1)-th surface, where n is an integer), nd denotes refractive index for d-line (wavelength λ=587.6 nm) and νd denotes an Abbe number for d-line (wavelength λ=587.6 nm). Further, OP denotes an object surface, "Variable" denotes a variable surface-to-surface distance. S denotes an aperture stop, and I denotes an image plane. Meanwhile, a radius of curvature r=∞ denotes a plane surface. Refractive index of air nd=1.000000 is omitted in the description. As for an aspherical surface, "*" is attached to the surface number and a value of a paraxial radius of curvature is indicated in the column of the radius of curvature r.

In [Aspherical Data], with respect to an aspherical surface shown in [Surface Data], the contour thereof is exhibited by the following expression (a):

$$X(y) = (y^2/r) / \{1 + (1 - K \times y^2/r^2)^{1/2}\} + A4 \times y^4 + A6 \times y^6 \quad (a)$$

where X(y) denotes a sag amount which is a distance in the direction of the optical axis from a tangent surface at a vertex of the aspherical surface to the aspherical surface at a vertical height y from the optical axis, r denotes a radius of curvature of a reference sphere (a paraxial radius of curvature), κ denotes a conical coefficient, and Ai denotes an aspherical surface coefficient of an i-th order. "E-n" denotes "×10$^{-n}$", for example, "1.234E-05" denotes "1.234×10$^{-5}$". The 2nd order aspherical surface coefficient A2 is 0, and omitted in the description.

In [Various Data], FNO denotes an F-number, 2ω denotes an angle of view (unit "°"), Y denotes an image height, TL denotes a total length of the variable magnification optical system, that is, a distance on the optical axis from the first surface to the image plane I upon focusing on the infinite distance object, and do denotes a variable interval between an n-th surface and an (n+1)-th surface, and d0 denotes a distance from the object to the most object side lens surface. Meanwhile, W denotes the wide-angle end state, M denotes the intermediate focal length state, and T denotes the telephoto end state.

In [Lens Group Data], a starting surface ST and a focal length f for each lens group are shown.

In [Vibration Reduction Data], K denotes a vibration reduction coefficient, θ denotes an angle of a rotational camera shake, that is, an angle of inclination (unit "°") of the variable magnification optical system according to the present Example, and Z denotes an amount of shift, that is, an amount of movement of the vibration reduction lens group in the direction perpendicular to the optical axis. Meanwhile, W denotes the wide-angle end state, M denotes the intermediate focal length state, and T denotes the telephoto end state.

In [Values for Conditional Expressions], values corresponding to respective conditional expressions in the variable magnification optical system according to the present Example are shown.

Here, it is noted that "mm" is generally used for the unit of length such as the focal length f, the radius of curvature r and the unit for other lengths shown in Table 1. However, since similar optical performance can be obtained by an optical system proportionally enlarged or reduced, the unit is not necessarily to be limited to "mm".

The above-mentioned reference symbols in Table 1 are also employed in the same manner in Tables of the after-mentioned Examples.

TABLE 1

First Example

[Surface Data]

| m | r | d | nd | vd |
|---|---|---|---|---|
| OP | ∞ | | | |
| 1 | 127.304 | 2.800 | 1.950000 | 29.37 |
| 2 | 89.338 | 9.900 | 1.497820 | 82.57 |
| 3 | −998.249 | 0.100 | | |
| 4 | 92.013 | 7.700 | 1.433852 | 95.25 |
| 5 | 696.987 | variable | | |
| 6 | 67.306 | 2.400 | 1.719990 | 50.27 |
| 7 | 33.224 | 10.250 | | |
| 8 | −131.888 | 2.000 | 1.618000 | 63.34 |
| 9 | 100.859 | 2.000 | | |
| 10 | 53.850 | 4.400 | 1.846660 | 23.83 |
| 11 | 193.868 | 3.550 | | |
| 12 | −73.371 | 2.200 | 1.603000 | 65.44 |
| 13 | 288.683 | variable | | |
| 14 (S) | ∞ | 2.500 | | |
| 15 | 581.555 | 3.700 | 1.834810 | 42.73 |
| 16 | −130.482 | 0.200 | | |
| 17 | 90.329 | 3.850 | 1.593190 | 67.90 |
| 18 | ∞ | 0.200 | | |
| 19 | 52.765 | 4.900 | 1.497820 | 82.57 |
| 20 | 448.658 | 2.043 | | |
| 21 | −118.745 | 2.200 | 2.001000 | 29.12 |
| 22 | 173.228 | 4.550 | | |
| 23 | 114.635 | 5.750 | 1.902650 | 35.73 |
| 24 | −66.799 | 2.200 | 1.581440 | 40.98 |
| 25 | 41.996 | variable | | |
| 26 | 57.835 | 4.800 | 1.497820 | 82.57 |
| 27 | −190.076 | 0.100 | | |
| 28 | 44.190 | 2.000 | 1.950000 | 29.37 |
| 29 | 28.478 | 5.550 | 1.593190 | 67.90 |
| 30 | 166.406 | variable | | |
| 31 | 52.698 | 1.800 | 1.804000 | 46.60 |
| 32 | 31.187 | 5.150 | | |
| 33 | 102.833 | 3.350 | 1.846660 | 23.83 |
| 34 | −102.758 | 1.600 | 1.719990 | 50.27 |
| 35 | 42.059 | 2.583 | | |
| 36 | ∞ | 1.600 | 1.953750 | 32.33 |
| 37 | 68.581 | 3.750 | | |
| 38 | 101.229 | 3.850 | 1.593190 | 67.90 |
| 39 | −172.177 | 0.150 | | |
| 40 | 47.985 | 3.900 | 1.719990 | 50.27 |
| 41 | 137.994 | BF | | |
| I | ∞ | | | |

[Various Data]

| Variable magnification ratio | | 2.74 | |
|---|---|---|---|
| | W | M | T |
| f | 71.5 | 135.0 | 196.0 |
| FNO | 2.9 | 2.9 | 2.9 |
| 2ω | 22.4 | 41.1 | 57.9 |
| Y | 21.6 | 21.6 | 21.6 |
| TL | 246 | 246 | 246 |
| BF | 54 | 54 | 54 |

TABLE 1-continued

First Example

| | W | M | T | W | M | T |
|---|---|---|---|---|---|---|
| β | | | | −0.09 | −0.16 | −0.23 |
| d0 | ∞ | ∞ | ∞ | 754 | 754 | 754 |
| d5 | 3.014 | 34.034 | 50.952 | 3.014 | 34.034 | 50.952 |
| d13 | 50.598 | 19.577 | 2.660 | 50.598 | 19.577 | 2.660 |
| d25 | 16.922 | 14.105 | 16.921 | 14.966 | 7.506 | 2.928 |
| d30 | 1.903 | 4.720 | 1.903 | 3.858 | 11.318 | 15.897 |

[Lens Group Data]

| Group | ST | f |
|---|---|---|
| 1 | 1 | 143.951 |
| 2 | 6 | −45.574 |
| 3 | 14 | 94.464 |
| 4 | 26 | 58.195 |
| 5 | 31 | −109.088 |

[Vibration Reduction Data]

| | f | K | θ | Z |
|---|---|---|---|---|
| W | 71.5 | −1.21 | 0.3 | −0.31 |
| M | 135.0 | −1.21 | 0.3 | −0.58 |
| T | 196.0 | −1.21 | 0.3 | −0.85 |

[Values for Conditional Expressions]

| (1) | f5/f2 = 2.39 |
|---|---|
| (2) | f3/f4 = 1.62 |
| (3) | f4/(−f2) = 1.28 |
| (4) | (−f5)/f4 = 1.87 |
| (5) | f1/(−f2) = 3.16 |
| (6) | f3/(−f2) = 2.07 |
| (7) | f1/(−f5) = 1.32 |

Figure 2A:
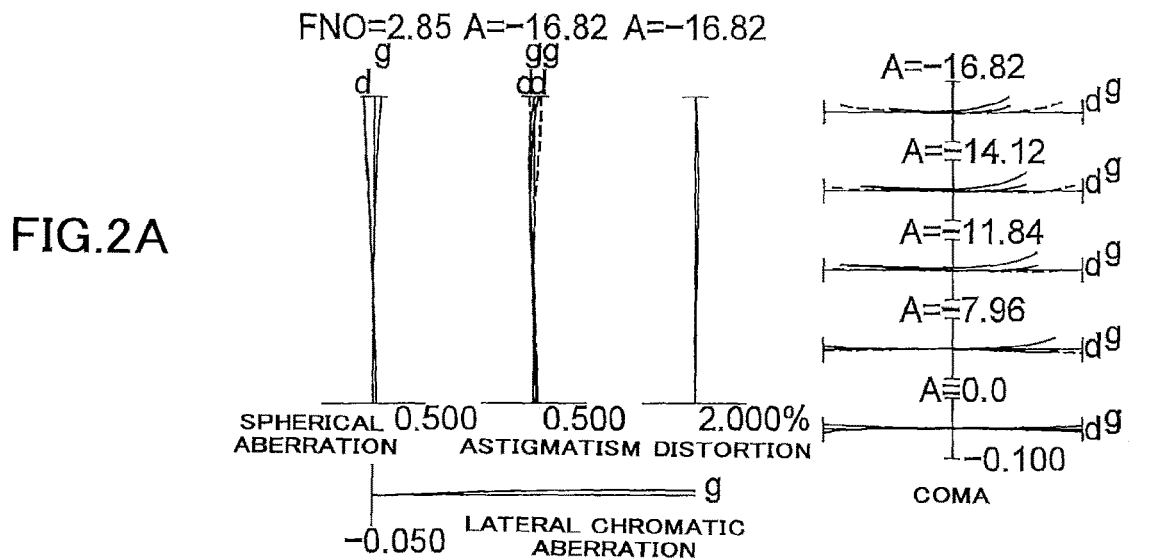
FIGS. 2A, 2B and 2C are graphs showing various aberrations of the variable magnification optical system according to the First Example upon focusing on an infinite distance object, FIG. 2A showing a wide-angle end state, FIG. 2B showing an intermediate focal length state, and FIG. 2C showing a telephoto end state.
Figure 2B:
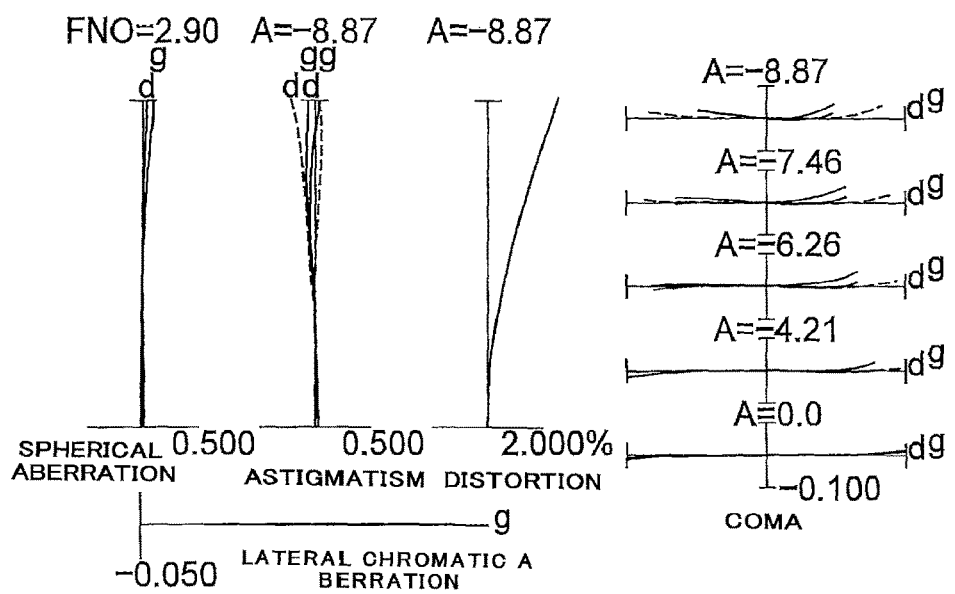
Figure 2C:
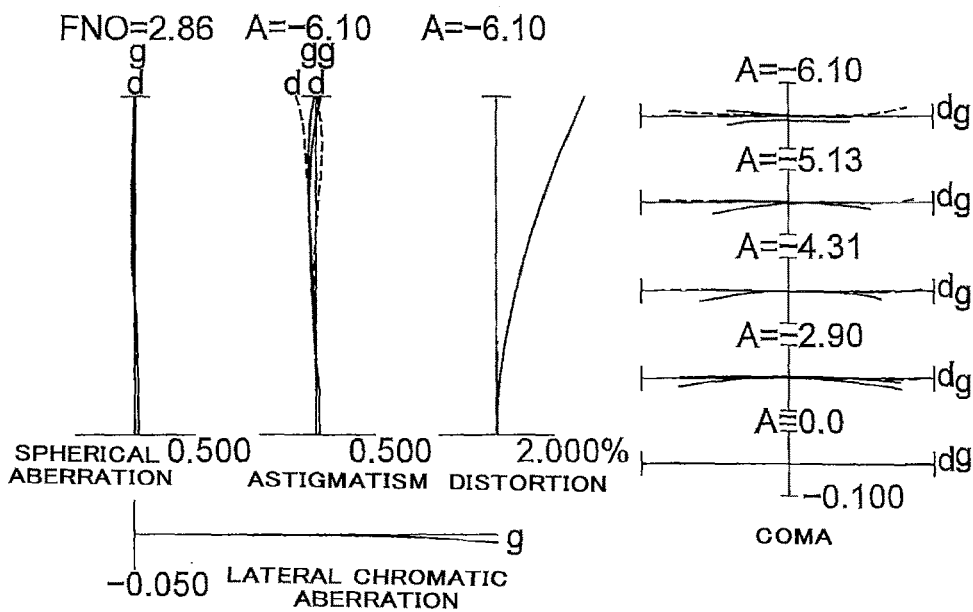

FIGS. 2A, 2B and 2C are graphs showing various aberrations of the variable magnification optical system according to the First Example upon focusing on an infinite distance object, FIG. 2A showing the wide-angle end state, FIG. 2B showing the intermediate focal length state, and FIG. 2C showing the telephoto end state.

Figure 3A:
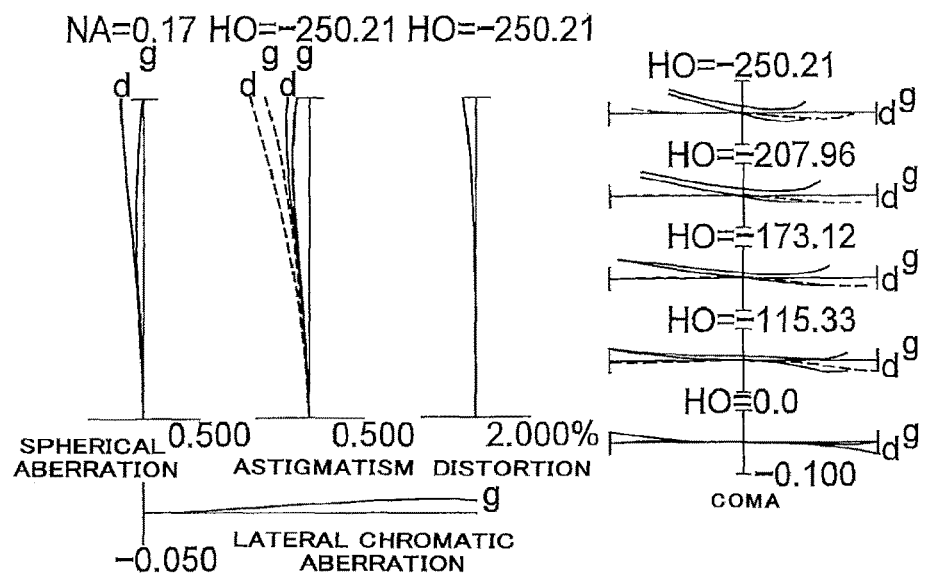
FIGS. 3A, 3B and 3C are graphs showing various aberrations of the variable magnification optical system according to the First Example, upon focusing on a finite distance object, FIG. 3A showing a wide angle end state, FIG. 3B showing an intermediate focal length state and FIG. 3C showing a telephoto end state, respectively.
Figure 3B:
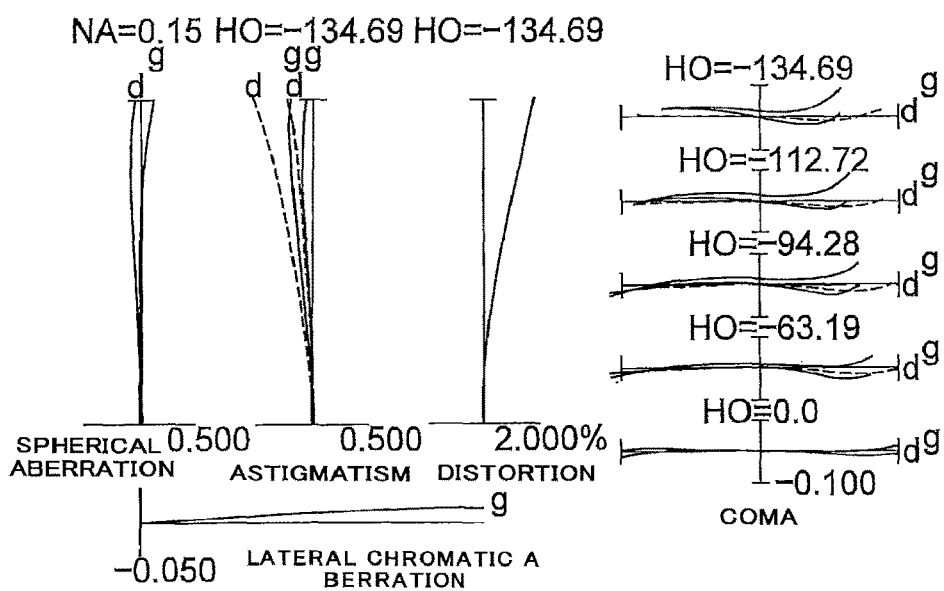
Figure 3C:
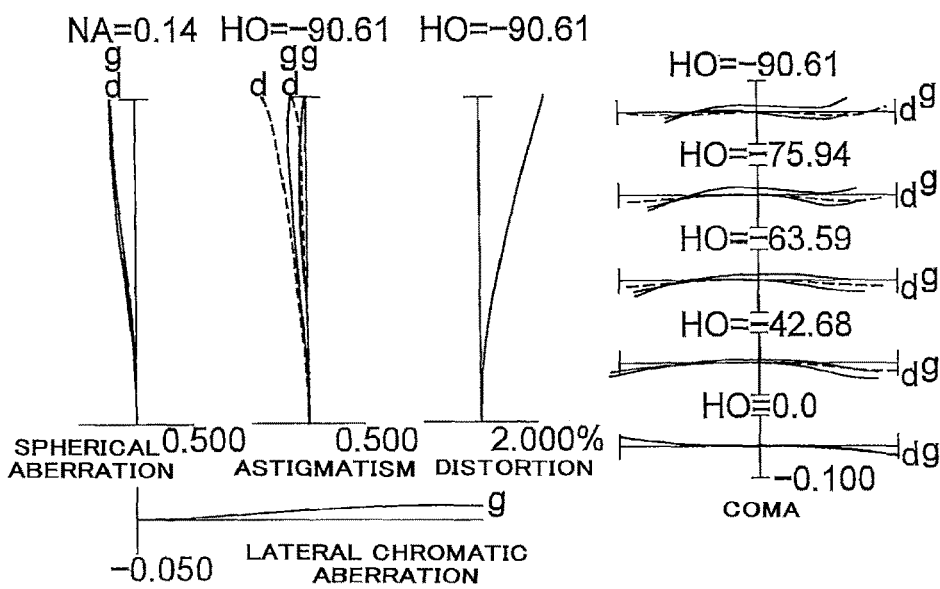

FIGS. 3A, 3B and 3C are graphs showing various aberrations of the variable magnification optical system according to the First Example upon focusing on a finite distance object, FIG. 3A showing the wide-angle end state, FIG. 3B showing the intermediate focal length state, and FIG. 3C showing the telephoto end state.

Figure 4A:
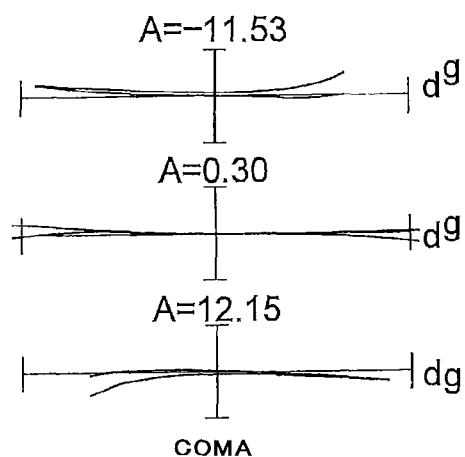
FIGS. 4A, 4B and 4C are meridional transverse aberration views when correction of image blur is conducted upon focusing on an infinite distance object of the variable magnification optical system according to the First Example, FIG. 4A showing a wide-angle end state, FIG. 4B showing an intermediate focal length state and FIG. 4C showing a telephoto end state.
Figure 4B:
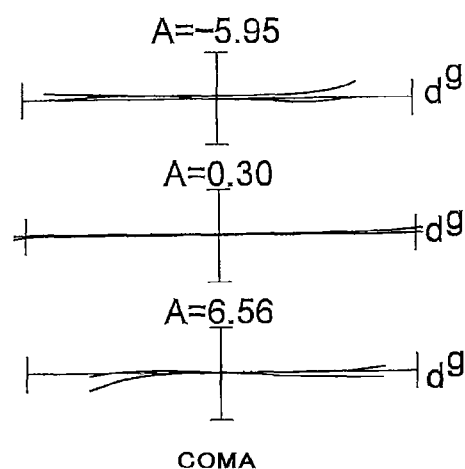
Figure 4C:
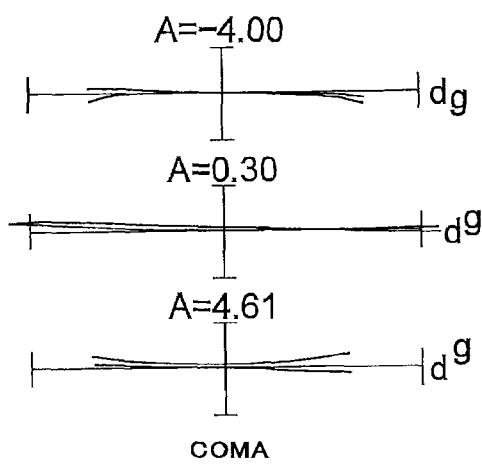

FIGS. 4A, 4B and 4C are graphs showing meridional transverse aberrations of the variable magnification optical system according to the First Example upon carrying out correction of image blur at the time when focusing on an infinite distance object is performed, FIG. 4A showing the wide-angle end state, FIG. 4B showing the intermediate focal length state, and FIG. 4C showing the telephoto end state.

In respective graphs of aberrations, FNO denotes an F-number, A denotes an incident angle of a light ray, that is, a half angle of view (unit "°"), NA denotes a numerical aperture, and HO denotes an object height (unit "mm"). To be specific, in the graph showing the spherical aberration, F-number FNO or numerical value NA for the maximum aperture is shown, in the graphs showing astigmatism and distortion the maximum values of the object height HO or half angle of view A are shown respectively, and in the graph showing the coma aberration value of each object height or half angle of view is shown. In respective graphs showing aberrations, d denotes an aberration curve at d-line (wavelength λ=587.6 nm), g denotes an aberration curve at g-line (wavelength λ=435.8 nm), and when neither d nor g is mentioned, a curve indicates an aberration at the d-line. In the graphs showing astigmatism, a solid line indicates sagittal image surface, and a broken line indicates meridional image surface. In graphs showing coma aberration, solid lines indicate meridional coma aberration for d-line and g-line, respectively, and a broken line indicates a meridional coma aberration. The graph showing coma aberration, indicates a coma aberration for each image height H0 or half angle of view A. Incidentally, the above-mentioned symbols in the present Example are also employed in the same manner in the graphs of the after-mentioned Examples.

It is apparent from the respective graphs of aberrations that the variable magnification optical system according to the present Example suppresses superbly variations in various aberrations upon varying magnification, and shows good corrections to various aberrations from a state where an infinite distance object is focused to a state where a finite distance object is focused, and also shows a high optical performance. Further, the variable magnification optical system according to the present Example shows also an excellent optical performance upon carrying out vibration reduction.

Second Example

Figure 5:
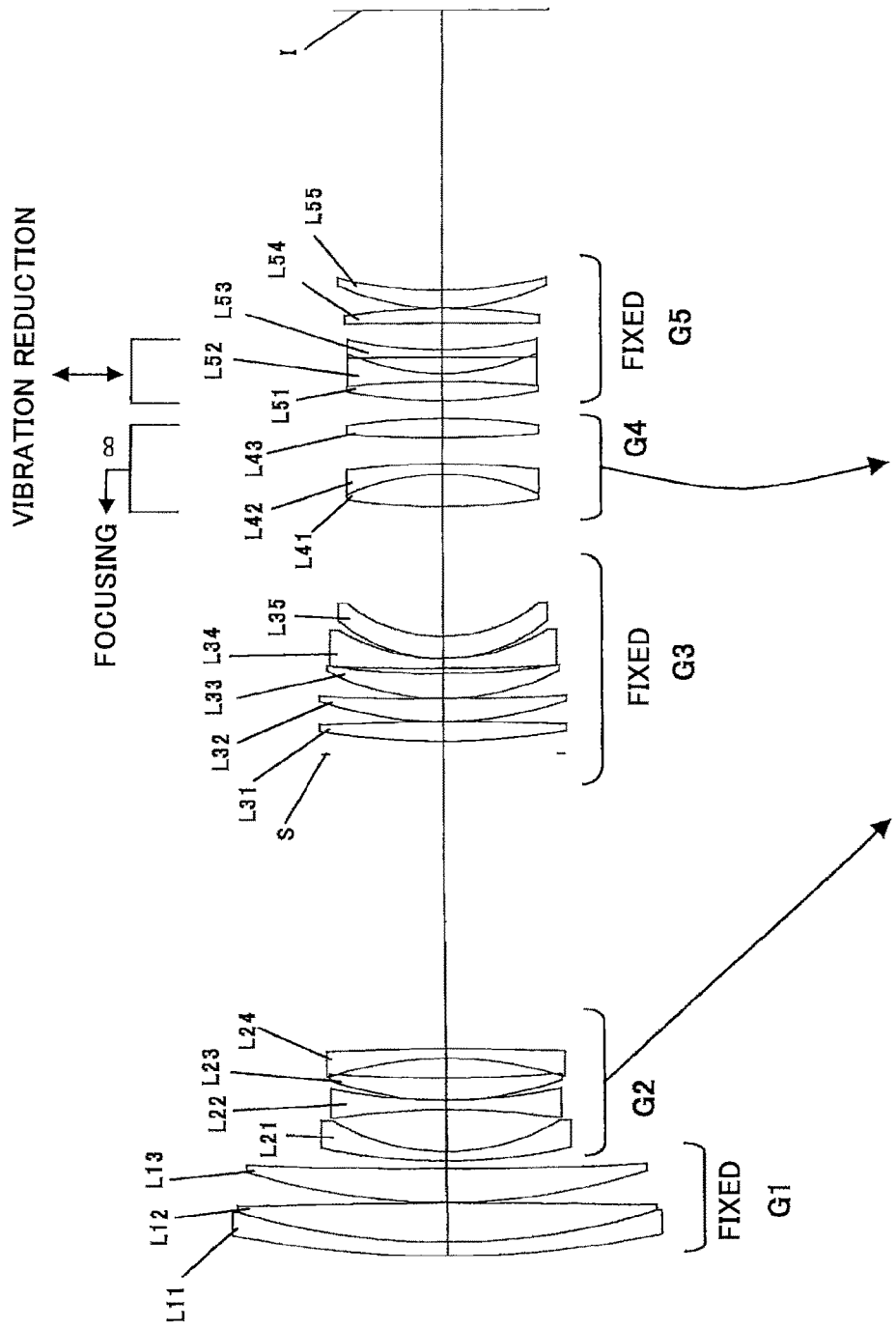
FIG. 5 is a sectional view showing a variable magnification optical system according to a Second Example, in a wide-angle end state.

FIG. 5 is a sectional view showing a variable magnification optical system according to the Second Example of the present embodiment in a wide-angle end state.

The variable magnification optical system according to the present Example is composed of, in order from an object side along the optical axis: a first lens group G1 having positive refractive power, a second lens group G2 having negative refractive power, a third lens group G3 having positive refractive power, a fourth lens group G4 having positive refractive power, and a fifth lens group G5 having negative refractive power.

The first lens group G1 consists of, in order from the object side along the optical axis, a cemented positive lens constructed by a negative meniscus lens L11 having a convex surface facing the object side cemented with a double convex positive lens L12, and a positive meniscus lens L13 having a convex surface facing the object side.

The second lens group G2 consists of, in order from the object side along the optical axis, a negative meniscus lens L21 having a convex surface facing the object side, a double concave negative lens L22, a positive meniscus lens L23 having a convex surface facing the object side and a negative meniscus lens L24 having a concave surface facing the object side.

The third lens group G3 consists of, in order from the object side along the optical axis, an aperture stop S, a double convex positive lens L31, a positive meniscus lens L32 having a convex surface facing the object side, a positive meniscus lens L33 having a convex surface facing the object side, a negative meniscus lens L34 having a convex surface facing the object side and a positive meniscus lens L35 having a convex surface facing the object side.

The fourth lens group G4 consists of a cemented positive lens constructed by a double convex positive lens L41 cemented with a negative meniscus lens L42 having a concave surface facing the object side, and a double convex positive lens L43.

The fifth lens group G5 consists of a cemented negative lens constructed by a double convex positive lens L51 cemented with a double concave negative lens L52, a double concave negative lens L53, double convex positive lens L54 and a positive meniscus lens L55 having a convex surface facing the object side.

An imaging device (not shown) composed of CCD, CMOS or the like, is disposed on the image plane I.

With the above-mentioned configuration, in the variable magnification optical system according to the present Example, upon varying magnification from the wide-angle end state to the telephoto end state, the second lens group G2 and the fourth lens group G4 are moved along the optical axis such that a distance between the first lens group G1 and the second lens group G2, a distance between the second lens group G2 and the third lens group G3, a distance between the third lens group G3 and the fourth lens group G4, and a distance between the fourth lens group G4 and the fifth lens group G5 are varied, respectively. To be specific, the second lens group G2 is moved toward the image side and the fourth lens group G4 is moved once toward the object side and then toward the image side. Meanwhile, upon varying magnification, the first lens group G1, the third lens group G3 and the fifth lens group G5 are fixed in positions with respect to the image plane I.

In the variable magnification optical system according to the present Example, focusing from the infinitely distant object to the finite distance object is carried out by moving the fourth lens group G4 as a focusing lens group toward the object side along the optical axis.

In the variable magnification optical system according to the present Example, correction of the image plane upon image blur being caused, that is, vibration reduction is carried out by moving the cemented negative lens constructed by the double convex positive lens L51 and the double concave negative lens L52 and the double concave negative lens L53 in the fifth lens group G5 as a vibration reduction lens group to have a component in a direction perpendicular to the optical axis.

Table 2 below shows various values of the variable magnification optical system according to the present Example.

TABLE 2

Second Example

[Surface Data]

| m | r | d | nd | νd |
|---|---|---|---|---|
| OP | ∞ | | | |
| 1 | 168.091 | 2.800 | 1.846660 | 23.80 |
| 2 | 113.985 | 7.600 | 1.497820 | 82.57 |
| 3 | −1342.958 | 0.100 | | |
| 4 | 105.542 | 6.500 | 1.497820 | 82.57 |
| 5 | 756.079 | variable | | |
| 6 | 93.277 | 1.800 | 1.713000 | 53.96 |
| 7 | 35.899 | 7.963 | | |
| 8 | −123.058 | 1.800 | 1.517420 | 52.20 |
| 9 | 88.115 | 0.100 | | |
| 10 | 55.675 | 4.150 | 1.846660 | 23.80 |
| 11 | 239.180 | 3.827 | | |
| 12 | −60.290 | 1.800 | 1.518230 | 58.82 |
| 13 | −401.012 | variable | | |
| 14 (S) | ∞ | 2.500 | | |
| 15 | 125.380 | 3.570 | 1.834810 | 42.73 |
| 16 | −451.692 | 0.100 | | |
| 17 | 60.877 | 4.360 | 1.593190 | 67.90 |
| 18 | 373.299 | 0.100 | | |
| 19 | 40.071 | 4.900 | 1.497820 | 82.57 |
| 20 | 128.851 | 0.987 | | |
| 21 | 370.600 | 1.800 | 1.688930 | 31.16 |
| 22 | 32.352 | 0.100 | | |
| 23 | 26.342 | 4.240 | 1.846660 | 23.80 |

TABLE 2-continued

Second Example

| | | | | |
|---|---|---|---|---|
| 24 | 25.137 | variable | | |
| 25 | 97.606 | 6.180 | 1.497820 | 82.57 |
| 26 | -39.284 | 2.000 | 1.903660 | 31.27 |
| 27 | -123.125 | 4.984 | | |
| 28 | 183.032 | 3.720 | 1.883000 | 40.66 |
| 29 | -106.025 | variable | | |
| 30 | 77.498 | 3.750 | 1.846660 | 23.80 |
| 31 | -155.434 | 1.500 | 1.902650 | 35.72 |
| 32 | 37.559 | 2.958 | | |
| 33 | -5844.463 | 1.500 | 1.497820 | 82.57 |
| 34 | 69.608 | 5.050 | | |
| 35 | 5387.656 | 2.800 | 1.622990 | 58.12 |
| 36 | -112.327 | 0.100 | | |
| 37 | 40.488 | 3.350 | 1.497820 | 82.57 |
| 38 | 72.067 | BF | | |
| I | ∞ | | | |

[Various Data]

| Variable magnification ratio | | 2.69 | |
|---|---|---|---|
| | W | M | T |
| f | 72.0 | 135.0 | 194.0 |
| FNO | 2.9 | 2.9 | 2.9 |
| 2ω | 21.5 | 39.9 | 57.9 |
| Y | 21.6 | 21.6 | 21.6 |
| TL | 239 | 239 | 239 |
| BF | 54 | 54 | 54 |

| | W | M | T | W | M | T |
|---|---|---|---|---|---|---|
| β | | | | -0.09 | -0.16 | -0.23 |
| d0 | ∞ | ∞ | ∞ | 761 | 761 | 761 |
| d5 | 1.500 | 37.617 | 56.701 | 1.500 | 37.617 | 56.701 |
| d13 | 56.701 | 20.584 | 1.500 | 56.701 | 20.584 | 1.500 |
| d24 | 24.968 | 21.322 | 24.968 | 22.209 | 12.365 | 6.511 |
| d29 | 3.434 | 7.080 | 3.434 | 6.192 | 16.037 | 21.890 |

[Lens Group Data]

| Group | ST | f |
|---|---|---|
| 1 | 1 | 157.007 |
| 2 | 6 | -53.476 |
| 3 | 14 | 89.612 |
| 4 | 25 | 67.129 |
| 5 | 30 | -136.615 |

[Vibration Reduction Data]

| | f | K | θ | Z |
|---|---|---|---|---|
| W | 72.0 | -1.20 | 0.3 | -0.31 |
| M | 135.0 | -1.20 | 0.3 | -0.59 |
| T | 194.0 | -1.20 | 0.3 | -0.85 |

[Values for Conditional Expressions]

| | |
|---|---|
| (1) | f5/f2 = 2.55 |
| (2) | f3/f4 = 1.33 |
| (3) | f4/(-f2) = 1.26 |
| (4) | (-f5)/f4 = 2.04 |
| (5) | f1/(-f2) = 2.94 |
| (6) | f3/(-f2) = 1.68 |
| (7) | f1/(-f5) = 1.15 |

Figure 6A:
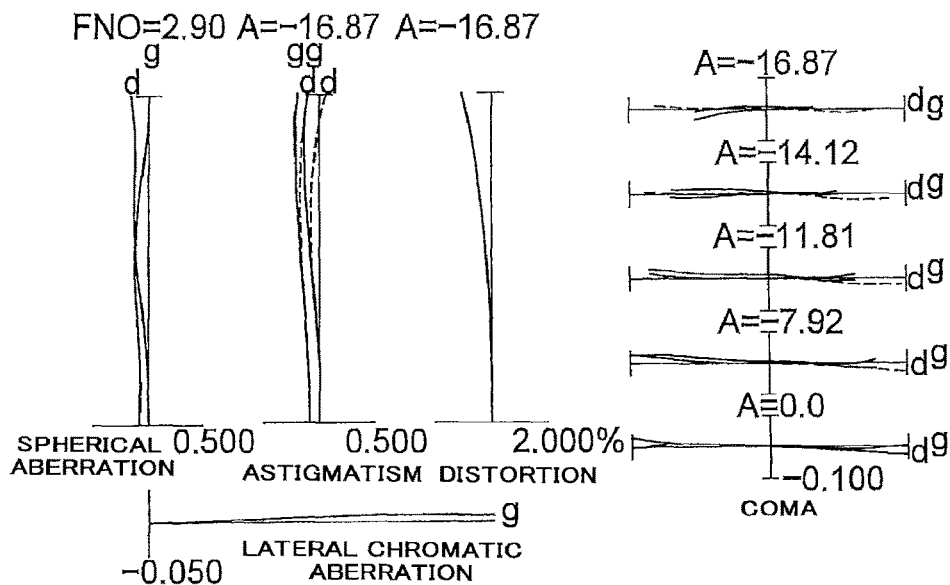
FIGS. 6A, 6B and 6C are graphs showing various aberrations of the variable magnification optical system according to the Second Example upon focusing on an infinite distance object, FIG. 6A showing a wide-angle end state, FIG. 6B showing an intermediate focal length state, and FIG. 6C showing a telephoto end state.
Figure 6B:
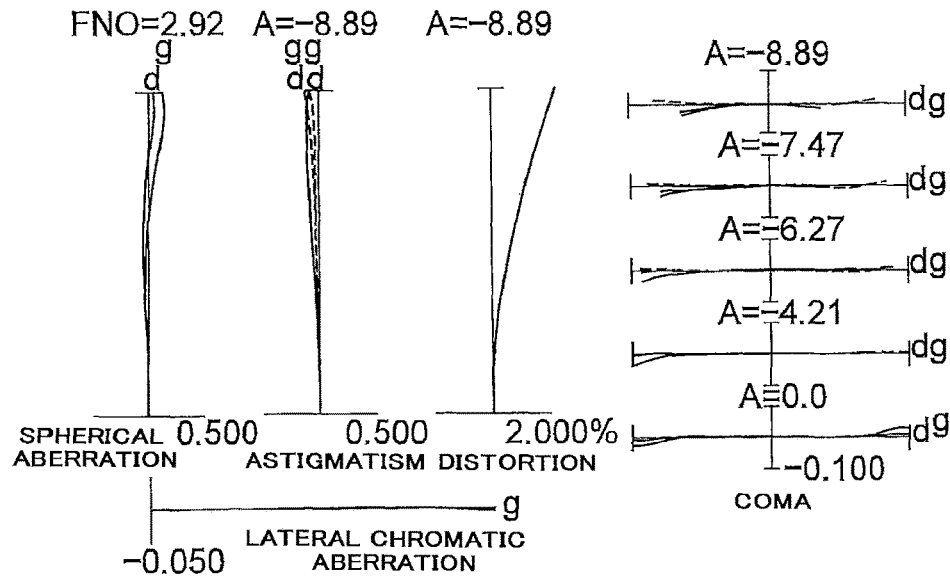
Figure 6C:
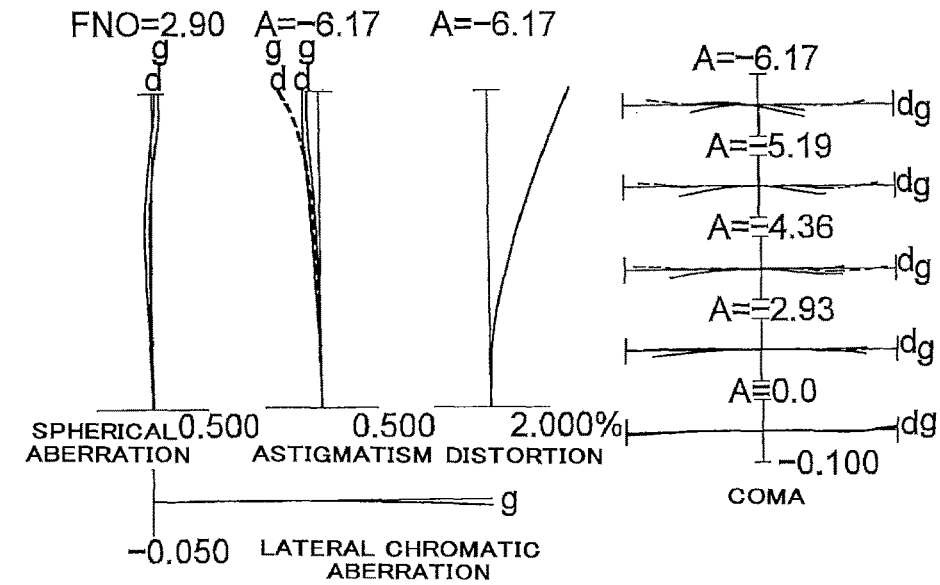

FIGS. 6A, 6B and 6C are graphs showing various aberrations of the variable magnification optical system according to the Second Example upon focusing on an infinite distance object, FIG. 6A showing the wide-angle end state, FIG. 6B showing the intermediate focal length state, and FIG. 6C showing the telephoto end state.

Figure 7A:
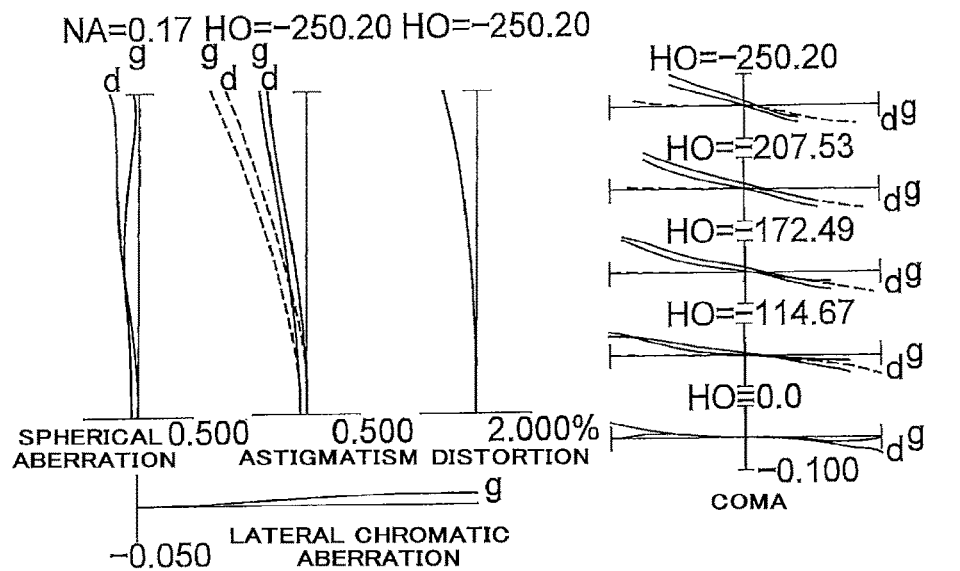
FIGS. 7A, 7B and 7C are graphs showing various aberrations of the variable magnification optical system according to the Second Example, upon focusing on a finite distance object, FIG. 7A showing a wide angle end state, FIG. 7B showing an intermediate focal length state and FIG. 7C showing a telephoto end state.
Figure 7B:
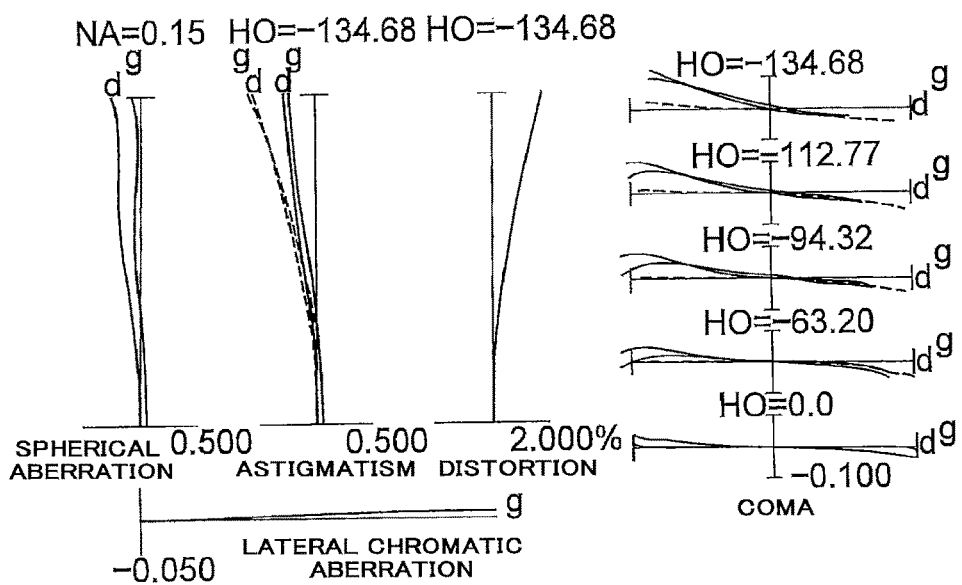
Figure 7C:
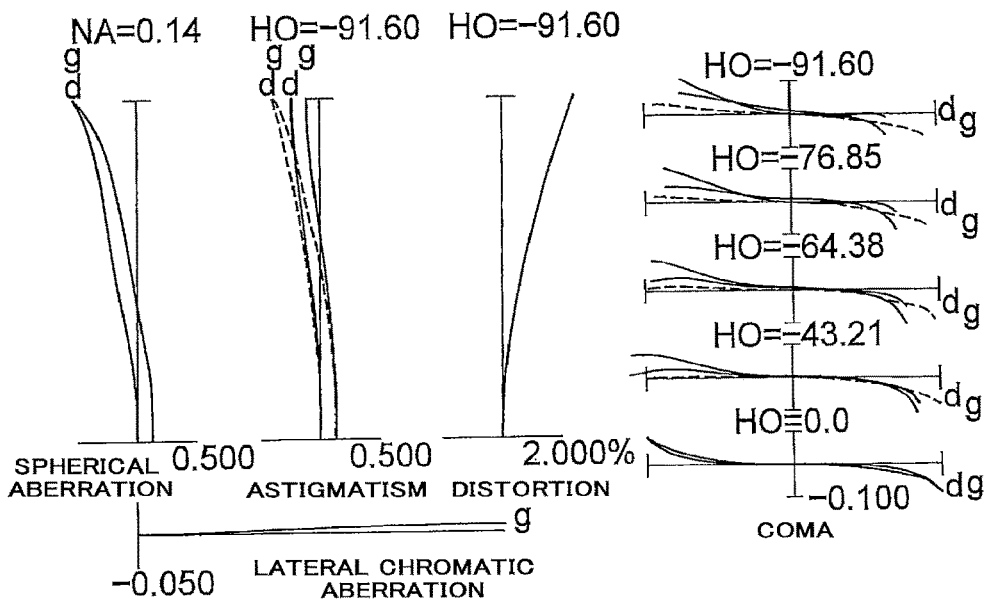

FIGS. 7A, 7B and 7C are graphs showing various aberrations of the variable magnification optical system according to the Second Example upon focusing on a finite distance object, FIG. 7A showing the wide-angle end state, FIG. 7B showing the intermediate focal length state, and FIG. 7C showing the telephoto end state.

Figure 8A:
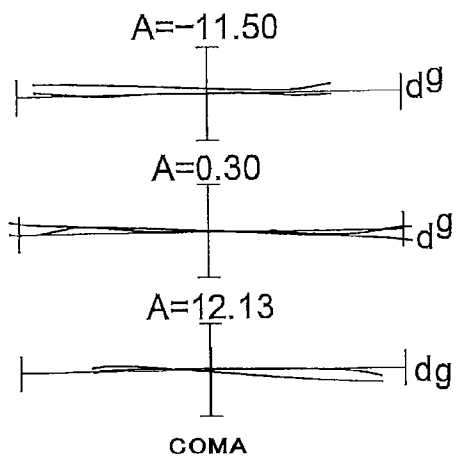
FIGS. 8A, 8B and 8C are meridional transverse aberration views when correction of image blur is conducted upon focusing on an infinite distance object of the variable magnification optical system according to the Second Example, FIG. 8A showing a wide-angle end state, FIG. 8B showing an intermediate focal length state and FIG. 8C showing a telephoto end state.
Figure 8B:
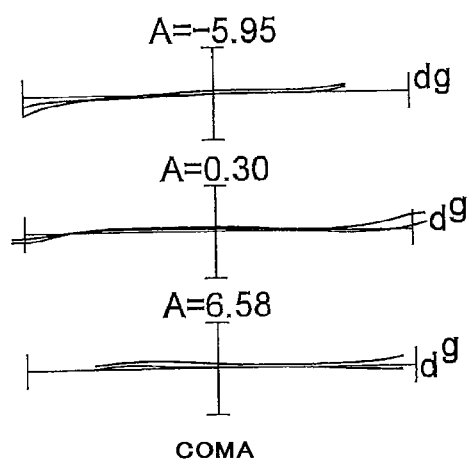
Figure 8C:
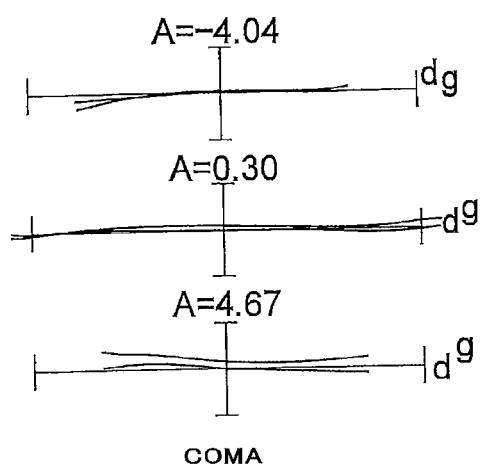

FIGS. 8A, 8B and 8C are graphs showing meridional transverse aberrations of the variable magnification optical system according to the Second Example upon carrying out correction of image blur at the time when focusing on an infinite distance object is performed, FIG. 8A showing the wide-angle end state, FIG. 8B showing the intermediate focal length state, and FIG. 8C showing the telephoto end state.

It is apparent from the respective graphs of aberrations that the variable magnification optical system according to the present Example suppresses superbly variations in various aberrations upon varying magnification, and shows good corrections to various aberrations from a state where an infinite distance object is focused to a state where a finite distance object is focused, and also shows a high optical performance. Further, the variable magnification optical system according to the present Example shows also an excellent optical performance upon carrying out vibration reduction.

Third Example

Figure 9:
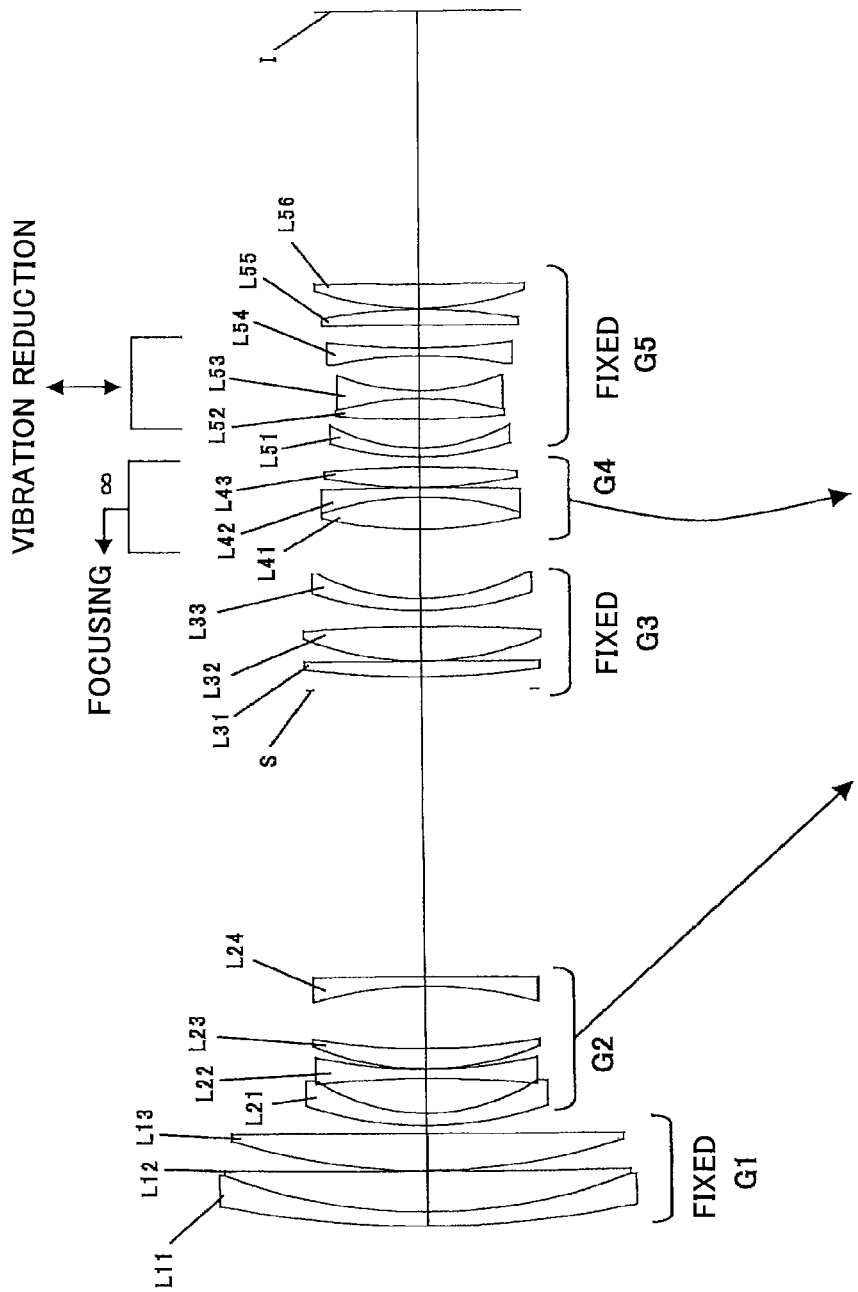
FIG. 9 is a sectional view showing a variable magnification optical system according to a Third Example, in a wide-angle end state.

FIG. 9 is a sectional view showing a variable magnification optical system according to the Third Example of the present embodiment in a wide-angle end state.

The variable magnification optical system according to the present Example is composed of, in order from an object side along the optical axis: a first lens group G1 having positive refractive power, a second lens group G2 having negative refractive power, a third lens group G3 having positive refractive power, a fourth lens group G4 having positive refractive power, and a fifth lens group G5 having negative refractive power.

The first lens group G1 consists of, in order from the object side along the optical axis, a cemented positive lens constructed by a negative meniscus lens L11 having a convex surface facing the object side cemented with a positive meniscus lens L12 having a convex surface facing the object side, and a double convex positive lens L13.

The second lens group G2 consists of, in order from the object side along the optical axis, a negative meniscus lens L21 having a convex surface facing the object side, a double concave negative lens L22, a positive meniscus lens L23 having a convex surface facing the object side and a negative meniscus lens L24 having a concave surface facing the object side.

The third lens group G3 consists of, in order from the object side along the optical axis, an aperture stop S, a positive meniscus lens L31 having a convex surface facing the object side, a double convex positive lens L32, a negative meniscus lens L33 having a convex surface facing the object side. The object side lens surface of the positive meniscus lens L31 is an aspherical surface.

The fourth lens group G4 consists of a cemented positive lens constructed by a double convex positive lens L41 cemented with a negative meniscus lens L42 having a concave surface facing the object side, and a double convex positive lens L43.

The fifth lens group G5 consists of a negative meniscus lens L51 having a convex surface facing the object side, a cemented negative lens constructed by a double convex positive lens L52 cemented with a double concave negative lens L53, a double concave negative lens L54, a positive meniscus lens L55 having a concave surface facing the object side and a positive meniscus lens L55 having a convex surface facing the object side.

An imaging device (not shown) composed of CCD, CMOS or the like, is disposed on the image plane I.

With the above-mentioned configuration, in the variable magnification optical system according to the present Example, upon varying magnification from the wide-angle end state to the telephoto end state, the second lens group G2 and the fourth lens group G4 are moved along the optical axis such that a distance between the first lens group G1 and the second lens group G2, a distance between the second lens group G2 and the third lens group G3, a distance between the third lens group G3 and the fourth lens group G4, and a distance between the fourth lens group G4 and the fifth lens group G5 are varied, respectively. To be specific, the second lens group G2 is moved toward the image side and the fourth lens group G4 is moved once toward the object side and then toward the image side. Meanwhile, upon varying magnification, the first lens group G1, the third lens group G3 and the fifth lens group G5 are fixed in positions with respect to the image plane I.

In the variable magnification optical system according to the present Example, focusing from the infinitely distance object to the finite distance object is carried out by moving the fourth lens group G4 as a focusing lens group toward the object side along to the optical axis.

In the variable magnification optical system according to the present Example, correction of the image plane upon image blur being caused, that is, vibration reduction is carried out by moving the cemented negative lens constructed by the double convex positive lens L52 and the double concave negative lens L53 and the double concave negative lens L54 in the fifth lens group G5 as a vibration reduction lens group to have a component in a direction perpendicular to the optical axis.

Table 3 below shows various values of the variable magnification optical system according to the present Example.

TABLE 3

Third Example

[Surface Data]

| m | r | d | nd | νd |
|---|---|---|---|---|
| OP | ∞ | | | |
| 1 | 167.356 | 2.800 | 1.953747 | 32.32 |
| 2 | 93.018 | 7.924 | 1.497820 | 82.57 |
| 3 | 1434.067 | 0.200 | | |
| 4 | 104.275 | 7.345 | 1.593190 | 67.90 |
| 5 | -12156.219 | variable | | |
| 6 | 60.998 | 2.400 | 1.762000 | 40.11 |
| 7 | 33.455 | 6.781 | | |
| 8 | -170.774 | 1.800 | 1.497820 | 82.57 |
| 9 | 81.934 | 0.100 | | |
| 10 | 47.360 | 4.035 | 1.846663 | 23.78 |
| 11 | 111.622 | 12.340 | | |
| 12 | -65.553 | 1.800 | 1.593190 | 67.90 |
| 13 | -1952.577 | variable | | |
| 14 (S) | ∞ | 2.500 | | |
| *15 | 123.030 | 3.035 | 1.772500 | 49.62 |
| 16 | 2330.078 | 0.100 | | |
| 17 | 51.250 | 6.876 | 1.497820 | 82.57 |
| 18 | -259.509 | 3.112 | | |
| 19 | 55.078 | 2.400 | 1.728250 | 28.38 |
| 20 | 36.743 | variable | | |
| 21 | 67.767 | 6.370 | 1.497820 | 82.57 |
| 22 | -51.825 | 1.800 | 1.647690 | 33.72 |
| 23 | -532.680 | 0.100 | | |
| 24 | 79.662 | 3.972 | 1.618000 | 63.34 |

TABLE 3-continued

Third Example

| 25 | -166.555 | variable | | |
|---|---|---|---|---|
| 26 | 49.657 | 1.800 | 1.903660 | 31.27 |
| 27 | 30.960 | 5.571 | | |
| 28 | 160.283 | 4.000 | 1.846663 | 23.78 |
| 29 | -52.297 | 1.500 | 1.744000 | 44.80 |
| 30 | 35.836 | 6.845 | | |
| 31 | -74.563 | 1.500 | 1.603420 | 38.03 |
| 32 | 108.157 | 4.512 | | |
| 33 | -15102.398 | 3.130 | 1.816000 | 46.59 |
| 34 | -89.747 | 0.200 | | |
| 35 | 50.592 | 4.745 | 1.593190 | 67.90 |
| 36 | 1672.813 | BF | | |
| I | ∞ | | | |

[Aspherical Data]
Surface No. 15

K = 1.0000
A4 = -1.26980E-06
A6 = -9.34669E-11

[Various Data]

| Variable magnification ratio | | 2.69 | |
|---|---|---|---|
| | W | M | T |
| f | 72.0 | 135.0 | 194.0 |
| FNO | 2.9 | 2.9 | 2.9 |
| 2ω | 23.0 | 44.6 | 57.4 |
| Y | 21.6 | 21.6 | 21.6 |
| TL | 239 | 239 | 239 |
| BF | 54 | 54 | 54 |

| | W | M | T | W | M | T |
|---|---|---|---|---|---|---|
| β | | | | -0.09 | -0.15 | -0.22 |
| d0 | ∞ | ∞ | ∞ | 761 | 761 | 761 |
| d5 | 1.500 | 37.556 | 56.704 | 1.500 | 37.556 | 56.704 |
| d13 | 56.704 | 20.648 | 1.500 | 56.704 | 20.648 | 1.500 |
| d20 | 13.716 | 11.844 | 13.716 | 12.224 | 7.053 | 3.962 |
| d25 | 2.000 | 3.872 | 2.000 | 3.492 | 8.663 | 11.754 |

[Lens Group Data]

| Group | ST | f |
|---|---|---|
| 1 | 1 | 162.392 |
| 2 | 6 | -53.478 |
| 3 | 14 | 80.590 |
| 4 | 21 | 60.086 |
| 5 | 26 | -93.338 |

[Vibration Reduction Data]

| | f | K | θ | Z |
|---|---|---|---|---|
| W | 72.0 | -1.55 | 0.3 | -0.24 |
| M | 135.0 | -1.55 | 0.3 | -0.46 |
| T | 194.0 | -1.55 | 0.3 | -0.66 |

[Values for Conditional Expressions]

(1)  f5/f2 = 1.75
(2)  f3/f4 = 1.34
(3)  f4/(-f2) = 1.12
(4)  (-f5)/f4 = 1.55
(5)  f1/(-f2) = 3.04
(6)  f3/(-f2) = 1.51
(7)  f1/(-f5) = 1.74

Figure 10A:
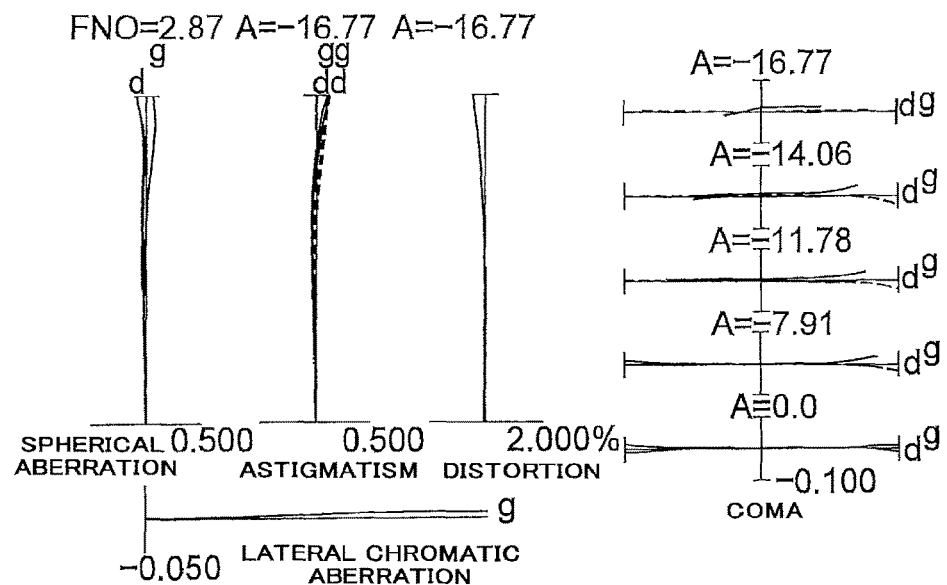
FIGS. 10A, 10B and 10C are graphs showing various aberrations of the variable magnification optical system according to the Third Example upon focusing on an infinite distance object, FIG. 10A showing a wide-angle end state, FIG. 10B showing an intermediate focal length state, and FIG. 10C showing a telephoto end state.
Figure 10B:
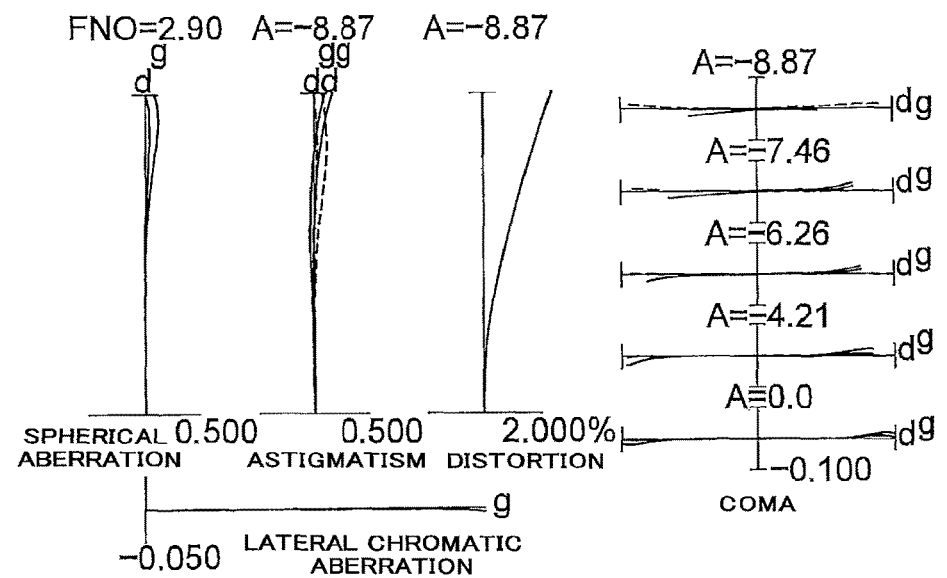
Figure 10C:
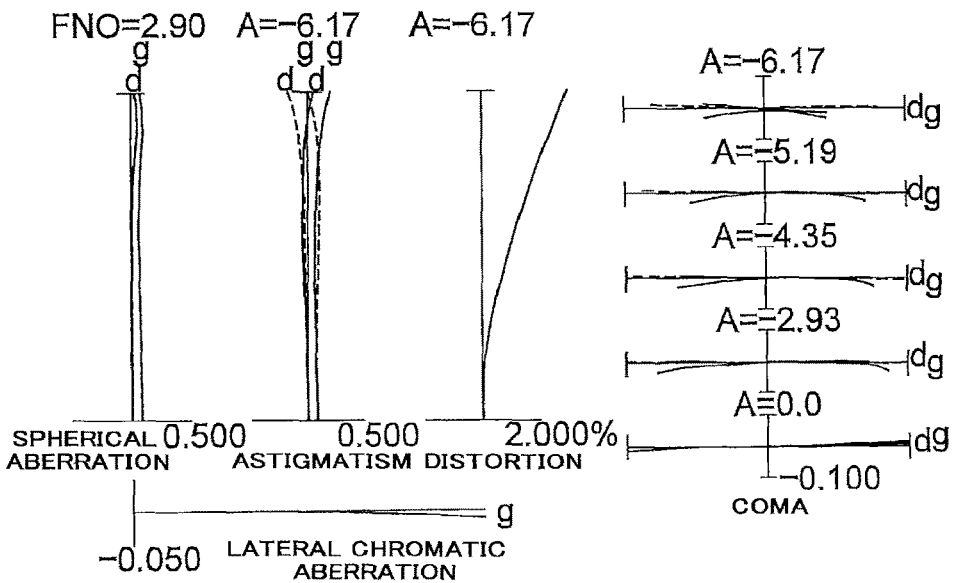

FIGS. 10A, 10B and 10C are graphs showing various aberrations of the variable magnification optical system according to the Third Example upon focusing on an infinite distance object, FIG. 10A showing the wide-angle end state, FIG. 10B showing the intermediate focal length state, and FIG. 10C showing the telephoto end state.

Figure 11A:
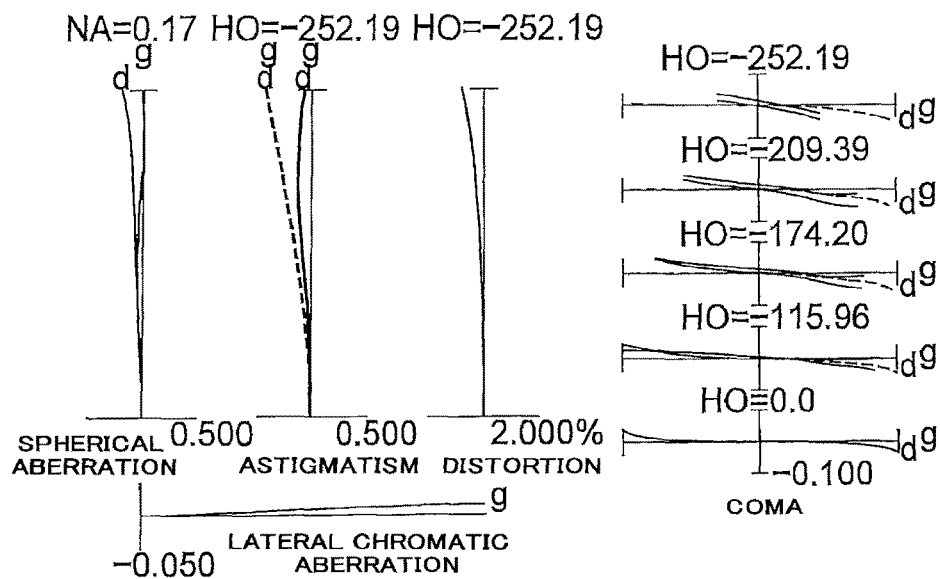
FIGS. 11A, 11B and 11C are graphs showing various aberrations of the variable magnification optical system according to the Third Example, upon focusing on a finite distance object, FIG. 11A showing a wide angle end state, FIG. 11B showing an intermediate focal length state and FIG. 11C showing a telephoto end state.
Figure 11B:
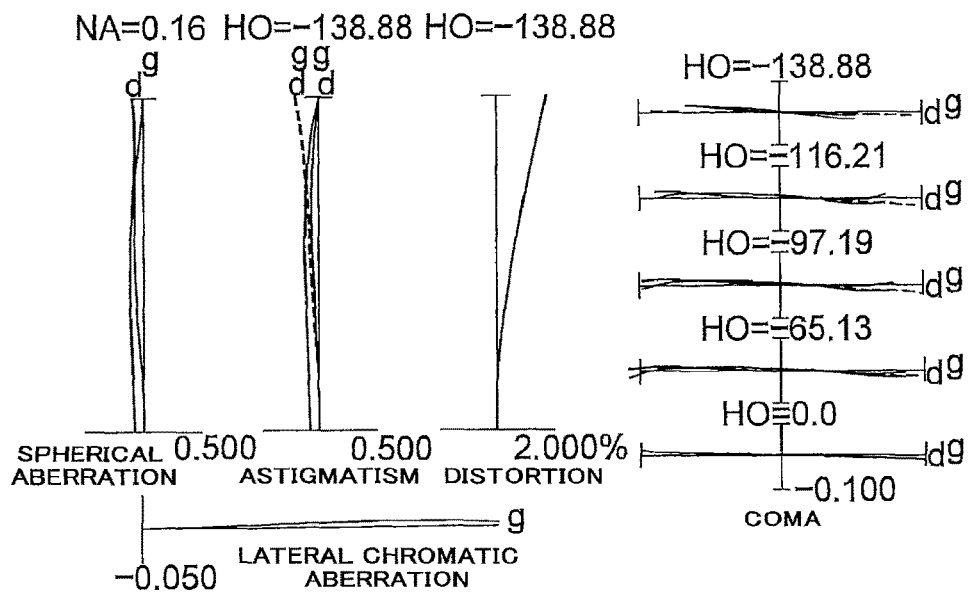
Figure 11C:
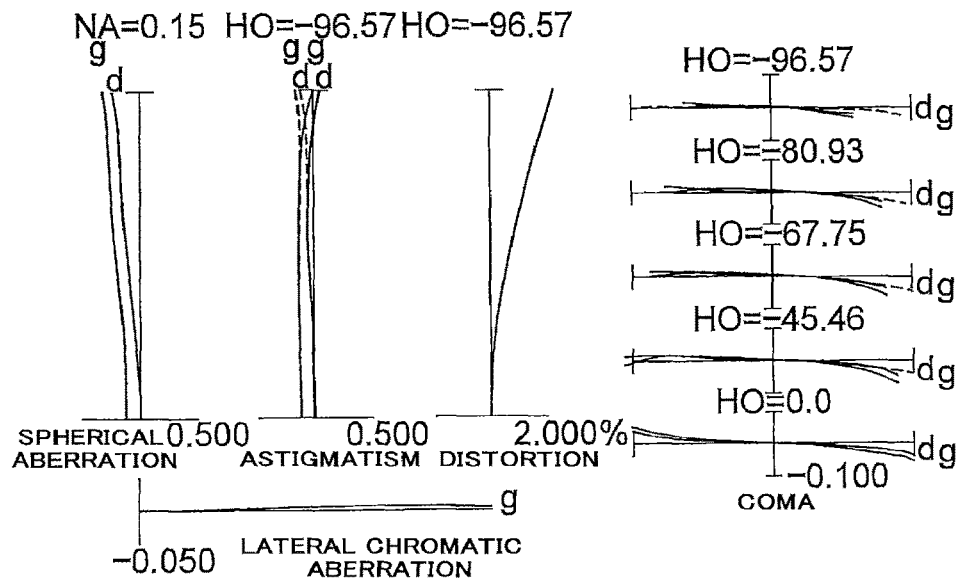

FIGS. 11A, 11B and 11C are graphs showing various aberrations of the variable magnification optical system according to the Third Example upon focusing on a finite distance object, FIG. 11A showing the wide-angle end state, FIG. 11B showing the intermediate focal length state, and FIG. 11C showing the telephoto end state.

Figure 12A:
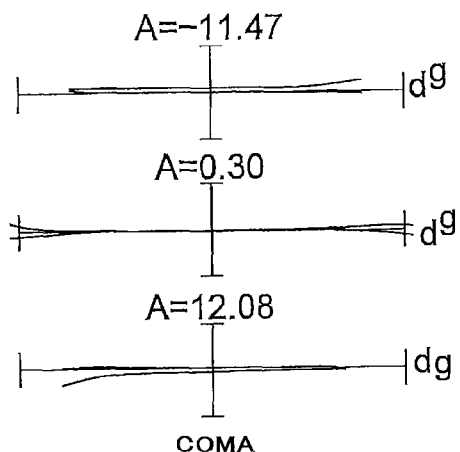
FIGS. 12A, 12B and 12C are meridional transverse aberration views when correction of image blur is conducted upon focusing on an infinite distance object of the variable magnification optical system according to the Third Example, FIG. 12A showing a wide-angle end state, FIG. 12B showing an intermediate focal length state and FIG. 12C showing a telephoto end state.
Figure 12B:
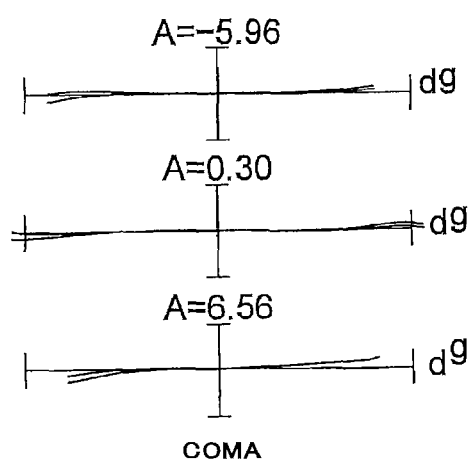
Figure 12C:
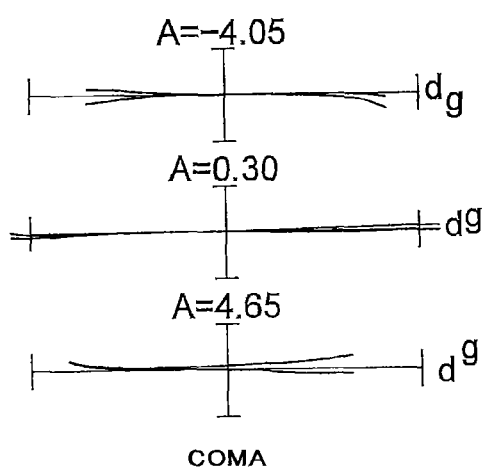

FIGS. 12A, 12B and 12C are graphs showing meridional transverse aberrations of the variable magnification optical system according to the Third Example upon carrying out correction of image blur at the time when focusing on an infinite distance object is performed, FIG. 12A showing the wide-angle end state, FIG. 12B showing the intermediate focal length state, and FIG. 12C showing the telephoto end state.

It is apparent from the respective graphs of aberrations that the variable magnification optical system according to the present Example suppresses superbly variations in various aberrations upon varying magnification, and shows good corrections to various aberrations from a state where an infinite distance object is focused to a state where a finite distance object is focused, and also shows a high optical performance. Further, the variable magnification optical system according to the present Example shows also an excellent optical performance upon carrying out vibration reduction.

According to the respective Examples, it is possible to realize a variable magnification optical system which can suppress superbly variations in aberrations upon varying magnification and has a high optical performance.

Note that each of the above described Examples is a concrete example of the invention of the present application, and the invention of the present application is not limited to them. The contents described below can be adopted without deteriorating an optical performance of the variable magnification optical systems of the present application.

Meanwhile, variable magnification ratio of the variable magnification optical systems according to the present embodiment is in the order of 2.0-to 5.0. Further, in the variable magnification optical systems according to the present embodiment, focal lengths in the wide angle end state are in the range of 60 to 80 mm in 35 mm conversion. Furthermore, in the variable magnification optical systems according to the present embodiment, F-number is in the order of f/2.0 to f/4.0.

Although the variable magnification optical systems each having five group configuration were illustrated above as numerical examples of the variable magnification optical systems of the present embodiment, the present embodiment is not limited to them and the variable magnification optical systems having other configurations (such as six group configuration, seven group configuration and the like) can be configured. Concretely, a lens configuration that a lens or a lens group is added to the most object side of the variable magnification optical system of the present embodiment is possible, and a lens configuration that a lens or a lens group is added to the most image side of the variable magnification optical system of the present application is also possible. Meanwhile, a lens group indicates parts including at least one lens, separated by air spaces being variable upon varying magnification.

Further, the fourth lens group in the entirety thereof is made a focusing lens group in the variable magnification optical system according to each of the above Examples, but a portion of any lens group, any lens group in the entirety thereof, or a plurality of lens groups can be moved in the direction of the optical axis as a focusing lens group. For example, it is possible that at least a portion of the first lens group, at least a portion of the second lens group, at least a portion of the third lens group, at least a portion of the fourth lens group, at least a portion of the fifth lens group or any combination thereof, is moved as the focusing lens group. The focusing lens group can be used for auto focus, and suitable for being driven by a motor for auto focus such as an ultrasonic motor.

Further, in each of the variable magnification optical systems of the present Examples, a portion of the fifth lens group is made to be a vibration reduction lens group, but any lens group in the entirety or in a portion thereof is moved as a vibration reduction lens group, to have a component in a direction perpendicular to the optical axis, or rotationally moved (swayed) in an intra-plane direction including the optical axis for correcting an image blur caused by a camera shake. Particularly, in the variable magnification optical systems of the present embodiment, it is preferable that at least a portion of the second lens group or at least a portion of the third lens group or at least a portion of the fourth lens group or at least a portion of the fifth lens group is used as a vibration reduction lens group.

Further, in the variable magnification optical systems of the present embodiment, it is preferable that an aperture stop is disposed between the second lens group and the third lens group, and the function may be substituted by a lens frame without disposing a member as an aperture stop.

Further, in the variable magnification optical systems of the present embodiment, a lens surface of a lens may be a spherical surface, a plane surface, or an aspherical surface. When a lens surface is a spherical surface or a plane surface, lens processing, assembling and adjustment become easy, and it is possible to prevent deterioration in optical performance caused by errors in lens processing, assembling and adjustment, so that it is preferable. Moreover, even if an image plane is shifted, deterioration in representation performance is little, so that it is preferable. When a lens surface is an aspherical surface, the aspherical surface may be fabricated by a grinding process, a glass molding process that a glass material is formed into an aspherical shape by a mold, or a compound type process that a resin material on a glass lens surface is formed into an aspherical shape. A lens surface may be a diffractive optical surface, and a lens may be a graded-index type lens (GRIN lens) or a plastic lens.

Moreover, the lens surface(s) of the lenses configuring the variable magnification optical systems of the present embodiment may be coated with anti-reflection coating(s) having a high transmittance in a broad wavelength range. With this contrivance, it is feasible to reduce a flare as well as ghost and attain a high optical performance with high contrast.

Next, a camera equipped with the variable magnification optical system according to the present embodiment will be explained with referring to FIG. 13.

Figure 13:
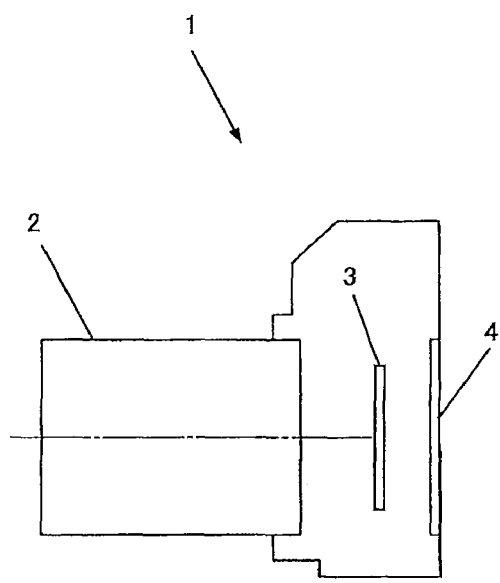
FIG. 13 is a schematic cross sectional view showing a construction of an optical apparatus equipped with the variable magnification optical system of the present application.

FIG. 13 is a sectional view showing a configuration of a camera equipped with the variable magnification optical system according to the present embodiment.

A camera 1 is a lens interchangeable type camera equipped with the variable magnification optical system according to the First Example as an imaging lens 2, as shown in FIG. 13.

In the camera 1, light emitted from an unillustrated object (an object to be imaged) is collected by the imaging lens 2, and forms an image of the object to be imaged on an imaging plane of an imaging part 3 through an unillustrated OLPF (optical low pass filter). The image of the object to be imaged is photo-electronically converted through a photoelectronic conversion element provided in the imaging part 3 to form an object image. This object image is displayed on an EVF (electronic view finder) 4 provided on the camera 1. Thus, a photographer can observe the object image through the EVF 4.

When the photographer presses an unillustrated release button, the object image formed through the imaging part 3 is stored in an unillustrated memory. Thus, the photographer can take a picture of the object to be imaged by the camera 1.

Here, the variable magnification optical system according to the First Example mounted on the camera 1 as the imaging lens 2 is a variable magnification optical system which suppresses superbly variations in aberrations upon varying magnification and has a high optical performance. Accordingly, the camera 1 can suppresses superbly variations in aberrations upon varying magnification and has a high optical performance. Incidentally, even if the camera is so composed that the variable magnification optical system according to the Second or Third Example is mounted on the camera as the imaging lens 2, the same effect can be attained as the camera 1. Moreover, the same effect as the above camera 1 is attained even in the case where the variable magnification optical system according to each of Examples as described, is mounted on a single lens reflex-type camera which is provided with a quick return mirror and in which an object to be imaged is observed through a finder optical system.

Figure 14:
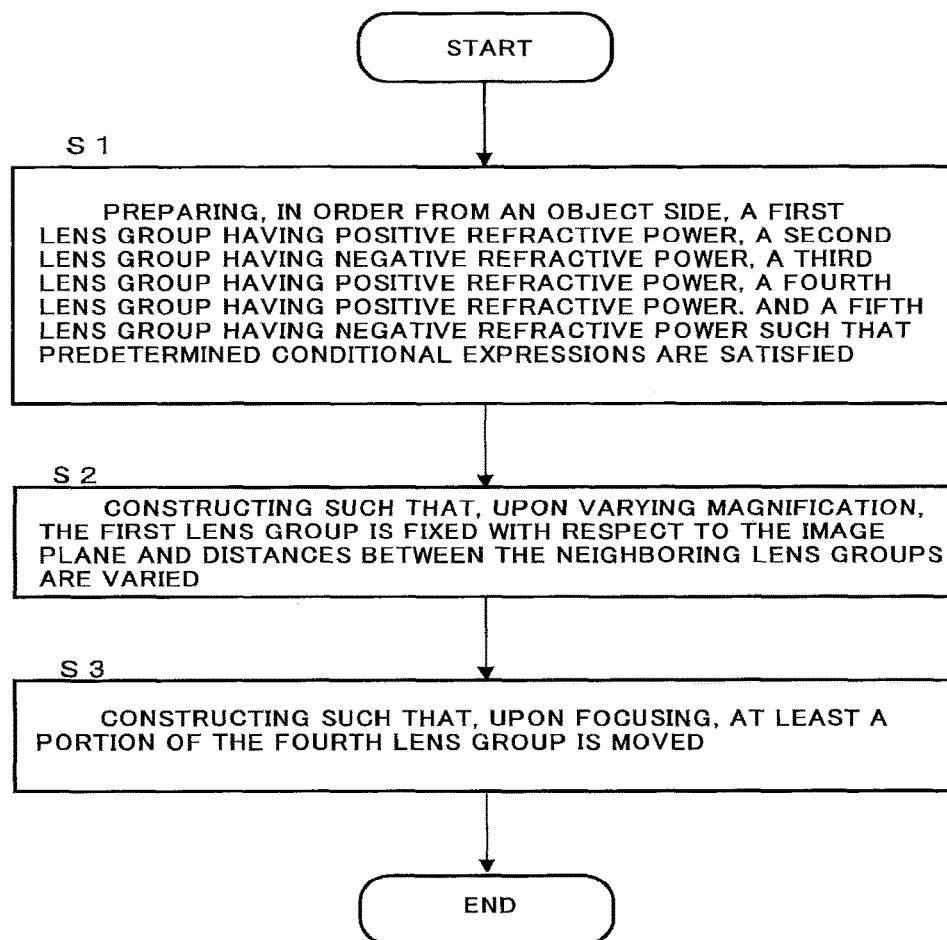
FIG. 14 is a flowchart schematically showing a method for manufacturing the variable magnification optical system of the present application.

Finally, an outline of a method for manufacturing a variable magnification optical system according to the present embodiment is described with referring to FIG. 14.

In a method for manufacturing a variable magnification optical system according to the present embodiment, as shown in FIG. 14, the variable magnification optical system comprises, in order from an object side: a first lens group having positive refractive power, a second lens group having negative refractive power, a third lens group having positive refractive power, a fourth lens group having positive refractive power, and a fifth lens group having negative refractive power. The method comprises the following steps of S1, S2 and S3:

Step S1: preparing, in order from an object side, a first lens group having positive refractive power, a second lens group having negative refractive power, a third lens group having positive refractive power, a fourth lens group having positive refractive power, and a fifth lens group having negative refractive power such that the following conditional expressions are satisfied:

$$1.20 < f5/f2 < 3.60 \quad (1)$$

$$0.80 < f3/f4 < 2.20 \quad (2)$$

where f5 denotes a focal length of the fifth lens group, f2 denotes a focal length of the second lens group, f3 denotes a focal length of the third lens group, and f4 denotes a focal length of the fourth lens group, and arranging respective lens groups in a lens barrel in order from the object side;

Step S2: by, for example, providing a known movement mechanism at the lens barrel, constructing such that, upon varying magnification, the first lens group is fixed with respect to the image plane and distances between the neighboring lens groups are varied; and Step S3: by, for example, providing a known movement mechanism at the lens barrel, constructing such that, upon focusing, at least a portion of the fourth lens group is moved.

Thus, the method for manufacturing the variable magnification optical system according to the present embodiment can manufacture a variable magnification optical system which suppresses superbly variations in aberrations upon varying magnification and has a high optical performance.

What is claimed is:

1. A variable magnification optical system comprising, in order from an object side: a first lens group having positive refractive power, a second lens group having negative refractive power, a third lens group having positive refractive power, a fourth lens group, and a fifth lens group;
   upon varying a magnification, distances between the neighboring respective lens groups being varied; and
   the following conditional expressions being satisfied:

$$1.00 < f3/(-f2) \le 2.10$$

$$1.00 < f1/(-f5) < 2.50$$

where f3 denotes a focal length of the third lens group, f2 denotes a focal length of the second lens group, f1 denotes a focal length of the first lens group, and f5 denotes a focal length of the fifth lens group.

2. A variable magnification optical system according to claim 1, wherein, upon focusing, at least a portion of the fourth lens group is moved.

3. A variable magnification optical system according to claim 1, wherein the third lens group comprises a lens having positive refractive power at the most object side.

4. A variable magnification optical system according to claim 1, wherein the first lens group comprises a lens having positive refractive power at the most image side.

5. A variable magnification optical system according to claim 1, wherein the following conditional expression is satisfied:

$$1.20 < f5/f2 < 3.60.$$

6. A variable magnification optical system according to claim 1, wherein the following conditional expression is satisfied:

$$0.64 < f4/(-f2) - 2.20$$

where f4 denotes a focal length of the fourth lens group.

7. A variable magnification optical system according to claim 1, wherein the following conditional expression is satisfied:

$$1.00 < f1/(-f2) < 4.50.$$

8. An optical system comprising a variable magnification optical system according to claim 1.

9. A variable magnification optical system comprising, in order from an object side: a first lens group having positive refractive power, a second lens group having negative refractive power, a third lens group having positive refractive power, a fourth lens group, and a fifth lens group;
   upon varying a magnification, distances between the neighboring respective lens groups being varied; and
   the following conditional expressions being satisfied:

$$2.60 < f1/(-f2) < 4.50$$

$$1.00 < f3/(-f2) \le 2.10$$

where f1 denotes a focal length of the first lens group, f2 denotes a focal length of the second lens group, and f3 denotes a focal length of the third lens group.

10. A variable magnification optical system according to claim 9, wherein, upon focusing, at least a portion of the fourth lens group is moved.

11. A variable magnification optical system according to claim 9, wherein the first lens group comprises a cemented lens constructed by, in order from the object side, a lens having negative refractive power and a lens having positive refractive power.

12. A variable magnification optical system according to claim 9, wherein the third lens group comprises a lens having positive refractive power at the most object side.

13. A variable magnification optical system according to claim 9, wherein the following conditional expression is satisfied:

$$1.20 < f5/f2 < 3.60$$

where f5 denotes a focal length of the fifth lens group.

14. A variable magnification optical system according to claim 9, wherein the following conditional expression is satisfied:

$$0.64 < f4/(-f2) < 2.20$$

where f4 denotes a focal length of the fourth lens group.

15. An optical system comprising a variable magnification optical system according to claim 9.

16. A variable magnification optical system comprising, in order from an object side: a first lens group having positive refractive power, a second lens group having negative refractive power, a third lens group having positive refractive power, a fourth lens group having positive refractive power, and a fifth lens group having negative refractive power;
   upon varying a magnification, distances between the neighboring respective lens groups being varied; and
   the following conditional expressions being satisfied:

$$0.64 < f4/(-f2) < 2.20$$

$$1.00 < f3/(-f2) < 3.00$$

where f4 denotes a focal length of the fourth lens group, f2 denotes a focal length of the second lens group, and f3 denotes a focal length of the third lens group.

17. A variable magnification optical system according to claim 16, wherein the following conditional expression is satisfied:

$$1.20 < f5/f2 < 3.60$$

where f5 denotes a focal length of the fifth lens group.

18. A variable magnification optical system according to claim 16, wherein the following conditional expression is satisfied:

$$0.80 < f3/f4 < 2.20.$$

19. A variable magnification optical system according to claim 16, wherein the following conditional expression is satisfied:

$$0.94 < (-f5)/f4 < 3.00$$

where f5 denotes a focal length of the fifth lens group.

20. A variable magnification optical system according to claim 16, wherein the following conditional expression is satisfied:

$$1.00 < f1/(-f2) < 4.50$$

where f1 denotes a focal length of the first lens group.

21. A variable magnification optical system according to claim 16, wherein the following conditional expression is satisfied:

$$0.60 < f1/(-f5) < 2.70$$

where f1 denotes a focal length of the first lens group, and f5 denotes a focal length of the fifth lens group.

22. An optical system comprising a variable magnification optical system according to claim 16.

23. A method for manufacturing one of the variable magnification optical systems A and B:
   the optical system A comprising, in order from an object side: a first lens group having positive refractive power, a second lens group having negative refractive power, a third lens group having positive refractive power, a fourth lens group, and a fifth lens group;
   the optical system B comprising, in order from an object side: a first lens group having positive refractive power, a second lens group having negative refractive power, a third lens group having positive refractive power, a fourth lens group having positive refractive power, and a fifth lens group having negative refractive power;
   the method for manufacturing the optical system A comprising steps of:
   constructing such that, upon varying a magnification, distances between the neighboring respective lens groups are varied; and
   constructing such that one of the following features X and Y is satisfied:
   the feature X comprising:
   constructing such that the following conditional expressions are satisfied:

$$1.00 < f3/(-f2) \le 2.10$$

$$1.00 < f1/(-f5) < 2.50$$

where f3 denotes a focal length of the third lens group, f2 denotes a focal length of the second lens group, f1 denotes a focal length of the first lens group, and f5 denotes a focal length of the fifth lens group; and
   the feature Y comprising:
   constructing such that the following conditional expressions are satisfied:

$$2.60 < f1/(-f2) < 4.50$$

$$1.00 < f3/(-f2) \le 2.10$$

where f1 denotes a focal length of the first lens group, f2 denotes a focal length of the second lens group, and f3 denotes a focal length of the third lens group; and
   the method for manufacturing the optical system B comprising steps of:
   constructing such that, upon varying a magnification, distances between the neighboring respective lens groups are varied; and
   constructing such that the following conditional expressions are satisfied:

$$0.64 < f4/(-f2) < 2.20$$

$$1.00 < f3/(-f2) < 3.00$$

where f4 denotes a focal length of the fourth lens group, f2 denotes a focal length of the second lens group, and f3 denotes a focal length of the third lens group.

* * * * *